(12) United States Patent
Mucignat et al.

(10) Patent No.: US 9,098,279 B2
(45) Date of Patent: Aug. 4, 2015

(54) METHODS AND SYSTEMS FOR DATA INTERCHANGE BETWEEN A NETWORK-CONNECTED THERMOSTAT AND CLOUD-BASED MANAGEMENT SERVER

(75) Inventors: Andrea Mucignat, San Francisco, CA (US); Oliver W. Steele, Amherst, MA (US); Senthilvasan Supramaniam, Sunnyvale, CA (US); Osborne B. Hardison, Palo Alto, CA (US); Richard J. Schultz, III, Mountain View, CA (US)

(73) Assignee: Google Inc., Mountain View, CA (US)

( * ) Notice: Subject to any disclaimer, the term of this patent is extended or adjusted under 35 U.S.C. 154(b) by 658 days.

(21) Appl. No.: 13/275,307

(22) Filed: Oct. 17, 2011

(65) Prior Publication Data
US 2012/0233478 A1    Sep. 13, 2012

(51) Int. Cl.
*G06F 1/00* (2006.01)
*G06F 1/32* (2006.01)
(Continued)

(52) U.S. Cl.
CPC .......... *G06F 1/3209* (2013.01); *H04L 12/2825* (2013.01); *H04L 2012/285* (2013.01); *H04W 52/0261* (2013.01)

(58) Field of Classification Search
CPC ............ H04L 69/22; H04L 12/66; G06F 1/32
USPC ................. 713/320, 1, 323; 236/51
See application file for complete search history.

(56) References Cited

U.S. PATENT DOCUMENTS

| 4,249,696 A | 2/1981 | Donnelly et al. |
| 4,847,781 A | 7/1989 | Brown, III et al. |

(Continued)

FOREIGN PATENT DOCUMENTS

| EP | 0 772 319 A2 | 10/1996 |
| EP | 1 148 749 A2 | 10/2001 |

(Continued)

OTHER PUBLICATIONS

Adam; Pass, "Access Your Computer Anytime and Save Energy with Wake-on-Lan", lifehacker.com.*

(Continued)

*Primary Examiner* — Thomas Lee
*Assistant Examiner* — Santosh R Poudel
(74) *Attorney, Agent, or Firm* — Kilpatrick Townsend & Stockton LLP

(57) ABSTRACT

Aspects of the present invention provide energy conserving communications for networked thermostats powered, in part, by batteries. A thermostat communication server stores a thermostat battery-level to determine what data should be sent to the thermostat. The thermostat communication server classifies types of data to be transmitted to the thermostat according to a data priority ranging from a low-priority to a high-priority data type. If the battery-level associated with the battery on the thermostat is at a low battery-level, the thermostat communication server may only transmit data classified under a high-priority data type. This conserves the power used by the thermostat, allows the battery on the thermostat time to recharge and perform other functions. If the battery-level of the thermostat is at a high level, the thermostat communication server may transmit a range of data to the thermostat classified from a low-priority type to a high-priority data type.

18 Claims, 16 Drawing Sheets

(51) Int. Cl.
  H04L 12/28 (2006.01)
  H04W 52/02 (2009.01)

(56) References Cited

U.S. PATENT DOCUMENTS

| | | | |
|---|---|---|---|
| 5,462,225 A | 10/1995 | Massara et al. | |
| 5,544,036 A | 8/1996 | Brown, Jr. et al. | |
| 5,761,083 A | 6/1998 | Brown, Jr. et al. | |
| 5,816,491 A | 10/1998 | Berkeley et al. | |
| 6,072,784 A | 6/2000 | Agrawal et al. | |
| 6,122,603 A | 9/2000 | Budike, Jr. | |
| 6,216,956 B1 | 4/2001 | Ehlers et al. | |
| 6,260,765 B1 | 7/2001 | Natale et al. | |
| 6,311,105 B1 | 10/2001 | Budike, Jr. | |
| 6,363,422 B1 | 3/2002 | Hunter et al. | |
| 6,574,581 B1 | 6/2003 | Bohrer et al. | |
| 6,643,567 B2 | 11/2003 | Kolk et al. | |
| 6,785,630 B2 | 8/2004 | Kolk et al. | |
| 6,975,958 B2 | 12/2005 | Bohrer et al. | |
| 7,028,203 B2* | 4/2006 | Nakai | 713/340 |
| 7,333,880 B2 | 2/2008 | Brewster et al. | |
| 7,346,467 B2 | 3/2008 | Bohrer et al. | |
| 7,765,419 B2* | 7/2010 | Fuccello | 713/324 |
| 7,832,465 B2* | 11/2010 | Zou et al. | 165/205 |
| 7,908,116 B2 | 3/2011 | Steinberg et al. | |
| 7,908,117 B2 | 3/2011 | Steinberg et al. | |
| 7,921,309 B1* | 4/2011 | Isbister et al. | 713/300 |
| 7,933,635 B2* | 4/2011 | Oh et al. | 455/574 |
| 7,967,212 B1* | 6/2011 | Euler et al. | 235/472.01 |
| 8,001,400 B2* | 8/2011 | Fadell | 713/320 |
| 8,023,432 B2* | 9/2011 | Herzog | 370/254 |
| 8,024,593 B2* | 9/2011 | Ito et al. | 713/324 |
| 8,090,477 B1 | 1/2012 | Steinberg | |
| 8,131,506 B2 | 3/2012 | Steinberg et al. | |
| 8,350,694 B1* | 1/2013 | Trundle et al. | 340/539.11 |
| 8,532,007 B2* | 9/2013 | Araki | 370/311 |
| 2002/0004911 A1* | 1/2002 | Nakai | 713/300 |
| 2003/0135772 A1* | 7/2003 | Haulk et al. | 713/324 |
| 2003/0137277 A1* | 7/2003 | Mori et al. | 320/132 |
| 2004/0034484 A1 | 2/2004 | Solomita, Jr. et al. | |
| 2005/0047382 A1* | 3/2005 | Park et al. | 370/338 |
| 2005/0097375 A1* | 5/2005 | Nakai | 713/300 |
| 2005/0119793 A1 | 6/2005 | Amundson et al. | |
| 2006/0077845 A1* | 4/2006 | Nakai | 369/53.22 |
| 2006/0102731 A1 | 5/2006 | Mueller et al. | |
| 2006/0236143 A1* | 10/2006 | Kidoguchi | 713/320 |
| 2007/0025390 A1* | 2/2007 | Jain | 370/458 |
| 2007/0043478 A1 | 2/2007 | Ehlers et al. | |
| 2007/0114295 A1* | 5/2007 | Jenkins | 236/51 |
| 2007/0183493 A1* | 8/2007 | Kimpe | 375/240.1 |
| 2007/0202837 A1* | 8/2007 | Araki et al. | 455/343.3 |
| 2007/0241203 A1 | 10/2007 | Wagner et al. | |
| 2008/0015740 A1 | 1/2008 | Osann | |
| 2008/0112348 A1* | 5/2008 | Park et al. | 370/311 |
| 2008/0133956 A1 | 6/2008 | Fadell | |
| 2008/0192666 A1* | 8/2008 | Koskan et al. | 370/311 |
| 2008/0260416 A1* | 10/2008 | Nosaki | 399/88 |
| 2008/0311961 A1* | 12/2008 | Cotevino et al. | 455/574 |
| 2008/0313481 A1* | 12/2008 | Paljug | 713/323 |
| 2009/0099699 A1 | 4/2009 | Steinberg et al. | |
| 2009/0125151 A1 | 5/2009 | Steinberg et al. | |
| 2009/0135751 A1* | 5/2009 | Hodges et al. | 370/311 |
| 2009/0140057 A1* | 6/2009 | Leen | 236/49.3 |
| 2009/0164823 A1* | 6/2009 | Aaltonen et al. | 713/340 |
| 2009/0228724 A1* | 9/2009 | Chinen et al. | 713/300 |
| 2009/0302996 A1* | 12/2009 | Rhee et al. | 340/3.32 |
| 2009/0307036 A1* | 12/2009 | Archer et al. | 705/8 |
| 2010/0033424 A1 | 2/2010 | Kabasawa et al. | |
| 2010/0084918 A1 | 4/2010 | Fells et al. | |
| 2010/0127881 A1* | 5/2010 | Schechter et al. | 340/584 |
| 2010/0128719 A1* | 5/2010 | Araki | 370/352 |
| 2010/0138926 A1* | 6/2010 | Kashchenko et al. | 726/25 |
| 2010/0225452 A1* | 9/2010 | Murdoch | 340/10.5 |
| 2010/0273610 A1 | 10/2010 | Johnson | |
| 2010/0282857 A1 | 11/2010 | Steinberg | |
| 2011/0006887 A1 | 1/2011 | Shaull et al. | |
| 2011/0015797 A1 | 1/2011 | Gilstrap | |
| 2011/0015798 A1 | 1/2011 | Golden et al. | |
| 2011/0015802 A1 | 1/2011 | Imes | |
| 2011/0022242 A1 | 1/2011 | Bukhin et al. | |
| 2011/0029488 A1 | 2/2011 | Fuerst et al. | |
| 2011/0106328 A1 | 5/2011 | Zhou et al. | |
| 2011/0166828 A1 | 7/2011 | Steinberg et al. | |
| 2011/0202730 A1* | 8/2011 | Sonoda et al. | 711/141 |
| 2011/0257795 A1 | 10/2011 | Narayanamurthy et al. | |
| 2011/0267974 A1* | 11/2011 | Kozaki et al. | 370/252 |
| 2011/0290893 A1 | 12/2011 | Steinberg | |
| 2012/0008581 A1 | 1/2012 | Kojima | |
| 2012/0053745 A1 | 3/2012 | Ng | |
| 2012/0086562 A1 | 4/2012 | Steinberg | |
| 2012/0089523 A1 | 4/2012 | Hurri et al. | |

FOREIGN PATENT DOCUMENTS

| | | |
|---|---|---|
| JP | 8-265373 A | 10/1996 |
| JP | 09-190394 A | 7/1997 |
| JP | 11-27316 A | 1/1999 |
| JP | 2002-10341 A | 1/2002 |
| JP | 2003-502913 A | 1/2003 |
| JP | 2004-511148 A | 4/2004 |
| JP | 2004-246811 A | 9/2004 |
| JP | 2006-340223 A | 12/2006 |
| JP | 2007-235197 A | 9/2007 |
| JP | 2007-267335 A * | 10/2007 |
| JP | 2007267335 A * | 10/2007 |
| JP | 2008-40680 A | 2/2008 |
| JP | 2008-516179 A | 5/2008 |
| JP | 2008-147738 A | 6/2008 |
| JP | 2013-540079 A | 10/2013 |
| WO | 00/78008 A1 | 12/2000 |
| WO | 2006/041599 A2 | 4/2006 |
| WO | 2009/008411 A1 | 1/2009 |
| WO | 2010033563 | 3/2010 |
| WO | 2010/113320 A1 | 10/2010 |
| WO | 2011149600 | 12/2011 |
| WO | 2012024534 | 2/2012 |

OTHER PUBLICATIONS

SCE Energy$mart Thermostat Study for Southern California Edison—Presentation of Study Results, Population Research Systems, Project #1010, Nov. 10, 2004, 51 pages.

Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.

Arens et al., "Demand Response Enabled Thermostat—Control Strategies and Interface", Demand Response Enabling Technology Development Poster, University of California Berkeley, Retrieved from dr.berkeley.edu/dream/posters/2004_11CEC_TstatPoster.pdf, 2004, 1 page.

Arens et al., "Demand Response Enabling Technology Development", Phase I Report: Jun. 2003-Nov. 2005, Jul. 27, P:/DemandRes/UC Papers/DR-Phase1Report-Final DraftApril24-26.doc, University of California Berkeley, pp. 1-108.

Arens et al., "New Thermostat Demand Response Enabling Technology", Poster, University of California Berkeley, Jun. 10, 2004.

Auslander et al., "UC Berkeley DR Research Energy Management Group", Power Point Presentation, DR ETD Workshop, State of California Energy Commission, Jun. 11, 2007, pp. 1-35.

Chatzigiannakis et al., "Priority Based Adaptive Coordination of Wireless Sensors and Actors," [online] Q2SWinet '06, Oct. 2, 2006 [Retrieved on Mar. 12, 2012]. Retrieved from the Internet: <URL: http://dl.acm.org/citation.cfm?id=1163681>.

Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.

De Almeida et al., "Advanced Monitoring Technologies for the Evaluation of Demand-Side Management Programs", Energy, vol. 19, No. 6, 1994, pp. 661-678.

(56) References Cited

OTHER PUBLICATIONS

Detroitborg, "Nest Learning Thermostat: Unboxing and Review", [online]. Feb. 2012 [retrieved on Aug. 22, 2013]. Retrieved from the Internet: <URL: http://www.youtube.com/watch?v=KrgcOL4oLzc>.

Gevorkian, "Alternative Energy Systems in Building Design", 2009, pp. 195-200.

Hoffman et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.

Levy, "A Vision of Demand Response—2016", The Electricity Journal, vol. 19, Issue 8, Oct. 2006, pp. 12-23.

Lopes, "Case Studies in Advanced Thermostat Control for Demand Response", AEIC Load Research Conference, St. Louis, MO, Jul. 2004, 36 pages.

Martinez, "SCE Energy$mart Thermostat Program", Advanced Load Control Alliance, Oct. 5, 2004, 20 pages.

Matty, "Advanced Energy Management for Home Use", IEEE Transaction on Consumer Electronics, vol. 35, No. 3, Aug. 1989, pp. 584-588.

Motegi et al., "Introduction to Commercial Building Control Strategies and Techniques for Demand Response", Demand Response Research Center, May 22, 2007, 35 pages.

International Patent Application No. PCT/US2011/061503, International Preliminary Report on Patentability, mailed May 30, 2013, 11 pages.

International Patent Application No. PCT/US2011/061503, International Search Report and Written Opinion Received, mailed Mar. 30, 2012, 11 pages.

Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley, 2008, pp. 7-242 through 7-253.

Peffer et al., "Smart Comfort at Home: Design of a Residential Thermostat to Achieve Thermal Comfort, and Save Money and Peak Energy", University of California Berkeley, Mar. 2007, 1 page.

Wright et al., "DR ETD—Summary of New Thermostate, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.

Japanese Office Action dated Apr. 27, 2015 for Japanese Patent Application No. JP 2013-540079 filed on Nov. 18, 2011, all pages.

\* cited by examiner

METHODS AND SYSTEMS FOR DATA INTERCHANGE BETWEEN A NETWORK-CONNECTED THERMOSTAT AND CLOUD-BASED MANAGEMENT SERVER

(1) CROSS-REFERENCE TO RELATED APPLICATIONS

The subject matter of this patent specification relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 61/415,771 filed Nov. 19, 2010; U.S. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666, U.S. Ser. No. 13/034,674 and U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501 filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; and U.S. Ser. No. 29/404,105 filed Oct. 14, 2011. The subject matter of this patent specification further relates to the subject matter of the following commonly assigned applications being filed on the same day as the present application: U.S. Ser. No. 13/275,311, entitled, "Methods, Systems, And Related Architectures For Managing Network Connected Thermostats"; U.S. Ser. No. 13/275,307 entitled, "Methods And Systems For Data Interchange Between A Network-Connected Thermostat And A Cloud-Based Management Server". Each of the above-referenced patent applications is incorporated by reference herein. The above-referenced patent applications are collectively referenced hereinbelow as "the commonly assigned incorporated applications."

(2) TECHNICAL FIELD

This patent specification relates to system monitoring and control, such as the monitoring and control of heating, ventilation, and air conditioning (HVAC) systems. More particularly, this patent specification relates to systems and methods for using a network enabled battery powered thermostat to monitor and control an HVAC system while conserving the use of energy from the battery.

(3) BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

It would be beneficial, at both a societal level and on a per-home basis, for a large number of homes to have their existing older thermostats replaced by newer, microprocessor controlled "intelligent" thermostats having more advanced HVAC control capabilities that can save energy while also keeping the occupants comfortable. To do this, these thermostats will need more information from the occupants as well as the environments where the thermostats are located. Preferably, these thermostats will also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Among other requirements, the successful implementation of intelligent network-connected thermostats into widespread, practical everyday use in a large number of homes and business requires the deployment of computers, networks, software systems and other network infrastructure capable of providing the necessary provisioning, data management, and support. Data communications methods between the intelligent thermostats and centrally provided management servers (which can also be termed "cloud-based" management servers), needs to be responsive, robust, and scalable. At the same time, however, the hardware and methodologies employed need to be compatible with, and workable in view of, a large installed base of conventional routers and network services that are already in homes and business, such that widespread adoption of the network-connected intelligent thermostats be commercially feasible.

One further issue that arises with thermostats relates to the limited external electrical power that is made available to the thermostat in many homes and businesses. As known in the art, for some installations, electronic thermostats can be powered directly from an HVAC system transformer by virtue of a 24 VAC "common" wire ("C-wire") that runs from the HVAC transformer to the thermostat. When provided, the C wire has the particular purpose of supplying power for an electronic thermostat. However, many HVAC installations do not have a C-wire provided to the thermostat. For such cases, many electronic thermostats have been designed to extract electrical power by a scheme called "power stealing," "power sharing" or "power harvesting," in which power is tapped from the HVAC control wires that lead to the HVAC call relay coils. Such thermostats "steal," "share" or "harvest" their power during the "OFF" or "inactive" periods of the heating or cooling system by allowing a small amount of current to flow through it into the call relay coil below its response threshold. During the "ON" or "active" periods of the heating or cooling system the thermostat can be designed to draw power by allowing a small voltage drop across itself. The amount of instantaneous electrical power that can safely be supplied by power stealing methods without falsely tripping or un-tripping the HVAC call relays is generally quite limited. These limitations can, in turn, can severely restrict the processing and network communications capabilities that can be provided on a power-stealing thermostat.

It would be desirable to provide a microprocessor controlled intelligent thermostat having advanced HVAC control capabilities that can save energy while also keeping the occupants comfortable. It would be further desirable to provide a such a thermostat that is network-capable. It would be even further desirable to provide a cloud-based thermostat management infrastructure to facilitate the provisioning, data management, and support of a large number of such network-connected intelligent thermostats. It would be still further desirable for such intelligent thermostats to be capable of such advanced processing, HVAC control, and networking functionalities while at the same time being capable of being powered by power-stealing, whereby a C-wire or household wall outlet power is not required, so that the thermostat is compatible with a broad array of practical HVAC installations in homes and businesses. It would be even further desirable to provide a network communications architecture, methodology, and protocol for facilitating data communications between the cloud-based management server and such intelligent network-connected thermostat. It would be still further desirable to provide such a thermostat and cloud-based management server in a way that is compatible with a large installed base of conventional routers and network services. Other issues arise as would be apparent to a person skilled in the art in view of the present disclosure.

SUMMARY

The commonly assigned U.S. Ser. No. 13/269,501 and others of the commonly assigned incorporated applications, supra, describe one or more advanced, multi-sensing, microprocessor-controlled intelligent or "learning" thermostats for which one or more of the preferred embodiments is particularly suitable, the thermostat providing a rich combination of processing capabilities, intuitive and visually pleasing user interfaces, and network connectivity, while at the same time not requiring a C-wire (or line power from a household 110V source such as a wall plug) even though the requisite underlying thermostat hardware can require greater instantaneous power than power-stealing can safely provide. The described thermostat achieves these goals at least by virtue of the use of a rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. Provided according to one or more embodiments herein are methods, systems and related architectures for facilitating network communications between the thermostat and a cloud-based management server in a manner that promotes reduced power usage and extended service life of the rechargeable battery, while at the same time accomplishing timely data transfer between the thermostat and the cloud-based management for suitable and time-appropriate control of the HVAC system.

According to one preferred embodiment, the thermostat includes circuitry for detecting a charge level of the rechargeable battery thereof ("battery level"), a microprocessor having a plurality of different power consumption modes including at least one "sleep" mode (lower-power) and at least one "wake" mode (higher-power), and a wireless communications module such as a Wi-Fi chip. The wireless communications module communicates with an integrated router associated with a local area network ("private network") that serves the home, business, or other structure ("enclosure") in which the thermostat is installed. The integrated router includes a network address translation (NAT) functionality and facilitates data connections between devices on the enclosure's private network and external devices on an outside public network such as the Internet. A cloud-based management server ("cloud server") having a public address on the Internet is configured and programmed to send data packets to, and receive data packets originating from, the wireless communications module of the thermostat. The wireless communications module is programmed and configured to forward data packets received from the thermostat microprocessor to the integrated router for delivery to the cloud server. The wireless communications module is further programmed and configured to receive data packets from the integrated router that originated at the cloud server, and to selectively forward the received data packets to the microprocessor based on a priority level that has been assigned thereto by the cloud server. For one embodiment, the received data packets have been assigned one of two priority levels, including a standard priority level and a keep-alive priority level. Standard priority packets are forwarded to the microprocessor. Keep-alive priority packets are discarded. If the microprocessor is in a sleep mode, the forwarding of a standard priority packet from the wireless communications chip to the microprocessor causes the microprocessor to enter into a wake mode. During a wake mode, the microprocessor may communicate with the cloud server through the wireless communications module as necessary, opening and closing connections as necessary, with associated packets from the cloud server having standard priority. Included in these communications are ongoing notifications from the thermostat to the cloud server of the current battery level of the thermostat. The cloud server keeps track of the latest battery level received from the thermostat. In the absence of an open connection established for other communications purposes, the microprocessor causes the wireless communication module to send a connection-opening long-polling packet to the cloud server, and keeps the connection open for a long-polling interval that is relatively long, such as 30-60 minutes. In the absence of any required activity, the thermostat microprocessor may subsequently enter a sleep mode during the long-polling interval. During periods of silence from the thermostat, which may correspond to periods of microprocessor sleep, the cloud server may process one or more events that potentially call for a communication to be made to the thermostat (hereinafter "potential communication-triggering events"), for example, remote user commands from a browser or smartphone user interface, external notifications or demand-response requests from utility companies, scheduled programming updates, and so forth. According to a preferred embodiment, the cloud server is configured and programmed to classify each potential communication-triggering event into one of a plurality of thermostatic importance classes, and then to determine whether to instantiate, or not to instantiate, a corresponding standard priority (and therefore microprocessor-waking) communication with the thermostat, wherein this determination is based on (i) the most recent battery level of the thermostat, and (ii) the thermostatic importance class. If the most recent battery level is at high or otherwise non-problematic levels, then standard priority communications are instantiated for all events, whereas if the most recent battery level is at lower or otherwise problematic levels, then standard priority communications are instantiated only for events in high thermostatic importance classes. Finally, the cloud server is configured and programmed to send keep-alive packets to the wireless communications module at predetermined keep-alive intervals, such as every one to five minutes, if there are no standard priority packets to be sent. In one simple example, simple "ACK" packets are sent by the cloud server as keep-alive priority packets, which the wireless communications module is programmed to discard, while all other packets from the cloud server are considered as standard priority packets and forwarded from the wireless communications module to the thermostat microprocessor. It is to be appreciated, however, that "keep-alive priority packet" is not to be construed as limited to TCP "ACK" packets, but rather can refer to any type of message that will pass through the router, get received by the Wi-Fi chip, and be interpreted by the Wi-Fi chip as a message that is not to invoke waking up the microprocessor. In one simple example, an event in which a setpoint temperature change command is received from a user through their smartphone remote control is classified by the cloud server as having a "high" thermostatic importance, and therefore it would trigger a microprocessor-waking standard-priority message to be sent during a long-polling interval, regardless of the battery level, which would wake up the microprocessor and command it to change the setpoint temperature. In contrast, a scheduled periodic software update event would be classified as "low" thermostatic importance by the cloud server, and therefore, if the latest battery level were low or otherwise problematic, the cloud server would not send a corresponding standard priority data communication to the thermostat, thereby allowing a sleeping microprocessor to remain asleep so that the battery would have a better chance of recharging to an acceptable level. Advantageously, at least by virtue of the above described long-polling aspects, the above described battery-conscious power-preserving scheme is compatible with the security firewall functionality built into the integrated router of the private network, since all connections are instantiated from within the private network by virtue of the long-polling functions described above. Advantageously, at the same time, at least by virtue of the above described keep-alive packets, the above described battery-conscious power-preserving scheme is compatible with the network address translation (NAT) table sensitivities of many common routers, which will often shut down NAT table entries in the absence of related traffic before the long polling interval has expired. Advantageously, at the same time, the described scheme is battery-conscious and battery-preserving in that, if the battery is low, a sleeping thermostat microprocessor would not be woken by the cloud server unless there is a thermostatically important event that needs to be taken care of. According to other preferred embodiments as described further herein, there may be more than two thermostatic importance classes assigned by the cloud server, more than two different battery levels considered in the cloud server's decision to send a communications packet, and more than two packet priority levels assigned by the cloud server. According to further preferred embodiments, there can furthermore be different levels of event or packet importance communicated from the wireless communication module to the microprocessor, such as by using different port numbers on transferred packets to represent different levels of importance.

Aspects of the present invention provide methods, systems and related architectures for communicating with a network of thermostats powered, in part, by batteries, such as rechargeable batteries. In one aspect of the present invention, a thermostat communication server communicates with a thermostat powered by a battery over a network. Using a public network, such as the Internet, the thermostat provides a battery-level over a communication channel established with the thermostat communication server. The thermostat communication server stores the battery-level in a storage area of the server to determine what data should be sent to the thermostat. Further, the thermostat communication server classifies one or more types of data to be transmitted to the thermostat over the communication channel according to a data priority ranging from a low-priority data type to a high-priority data type. The low-priority data type includes data of lesser importance to the operation of the thermostat communication server and thermostat while the high-priority data type includes data of much higher importance. If the battery-level associated with the battery used by the thermostat is at a low battery-level, the thermostat communication server may only transmit data classified under a high-priority data type over the communication channel to the thermostat. This conserves the power used by the thermostat, allows the battery on the thermostat time to recharge and perform other functions. However, if the battery-level of the thermostat is determined to be at a high-level, the thermostat communication server may transmit a range of data classified from a low-priority type to a high-priority data type over the communication channel to the thermostat.

In another aspects of the present invention, the communication channel is established using a public network address registered on the Internet for the thermostat communication server and a public network address provided through a router's network address translation (NAT) table for the thermostat on a private network. To keep the communication channel available, the thermostat communication server configures a long-poll interval using a network communication protocol, such as TCP over IP, that transmits a keep-alive packet from the thermostat communication server to the thermostat over the communication channel at a maximum time interval not to exceed a NAT time-out period of the router.

In yet another aspect of the present invention, the thermostat communication server uses a plurality of communication channels to transmit different data priority types to the thermostat. In one embodiment, the thermostat communication server receives a request from a thermostat to establish the plurality of communication channels between the thermostat communication server and the thermostat. Further, the thermostat communication server classifies one or more types of data to be transmitted to the thermostat according to a data priority ranging from a low-priority data type to a high-priority data type. The thermostat communication server transmits data classified in the low-priority data type to the thermostat over a first network communication channel associated with low-priority data type and transmits data classified in the high-priority data type to the thermostat over a second network communication channel associated with high-priority data type.

In another aspect of the invention, the thermostat reserves a first communication channel on the thermostat for receiving data classified as a low-priority data type and reserves a second communication channel on the thermostat for receiving data classified as a high-priority data type. The thermostat processes data received from the thermostat communication server over the first communication channel and the second communication channel and determines whether a battery-level of the battery associated with the thermostat is at or below a low battery-level. When the battery-level is at or below the low battery-level, the thermostat configures itself to discard subsequently received data over the first communication channel classified as a low-priority data type while enabling a processing of subsequently received data over the second communication channel classified as a high-priority data type. If the thermostat determines the battery-level above the low battery-level, the thermostat configures itself to enable a processing of subsequently received data over the first communication channel classified as a low-priority data type and also enable a processing of subsequently received data over the second communication channel classified as a high-priority data type.

Another aspect of the invention includes using a proxy reporting thermostat to collect thermostat events from a plurality of thermostats on a network and then store on a central server. The proxy reporting thermostat is part of a thermostat reporting group made up of a plurality of thermostats powered by batteries. In some embodiments, the proxy reporting thermostat is selected from the thermostat reporting group because it has the highest battery-level charge. Each thermostat in the group records its events in a log corresponding to the operation and events occurring on each thermostat. These events recorded by each thermostat are transmitted over a network, gathered together, and stored in a storage area associated with the proxy reporting thermostat. A thermostat identifier included with each event indicates on which thermostat each event occurred. After a period of time or when the storage area becomes full, the proxy reporting thermostat uploads events from the thermostat reporting group to a central server. If a connection is not already established, the proxy reporting thermostat establishes a communication channel with the central server, which is typically on the Internet. Once the events gathered on the storage area associated with the proxy reporting thermostat have been uploaded, the storage area on the proxy reporting thermostat may be cleared to allow for the storage of new events from the group.

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Figure 1:
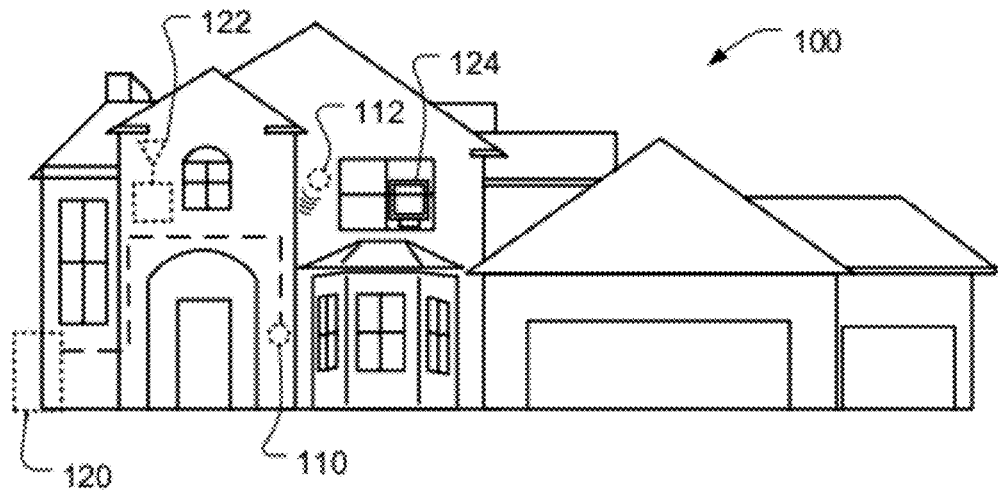
FIG. 1 is a diagram illustrating an exemplary enclosure using a thermostat implemented in accordance with embodiments of the present invention for controlling one or more environmental conditions.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input. As used herein, a "primary" thermostat refers to a thermostat that is electrically connected to actuate all or part of an HVAC system, such as by virtue of electrical connection to HVAC control wires (e.g. W, G, Y, etc.) leading to the HVAC system. As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat. In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service. Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an adhoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
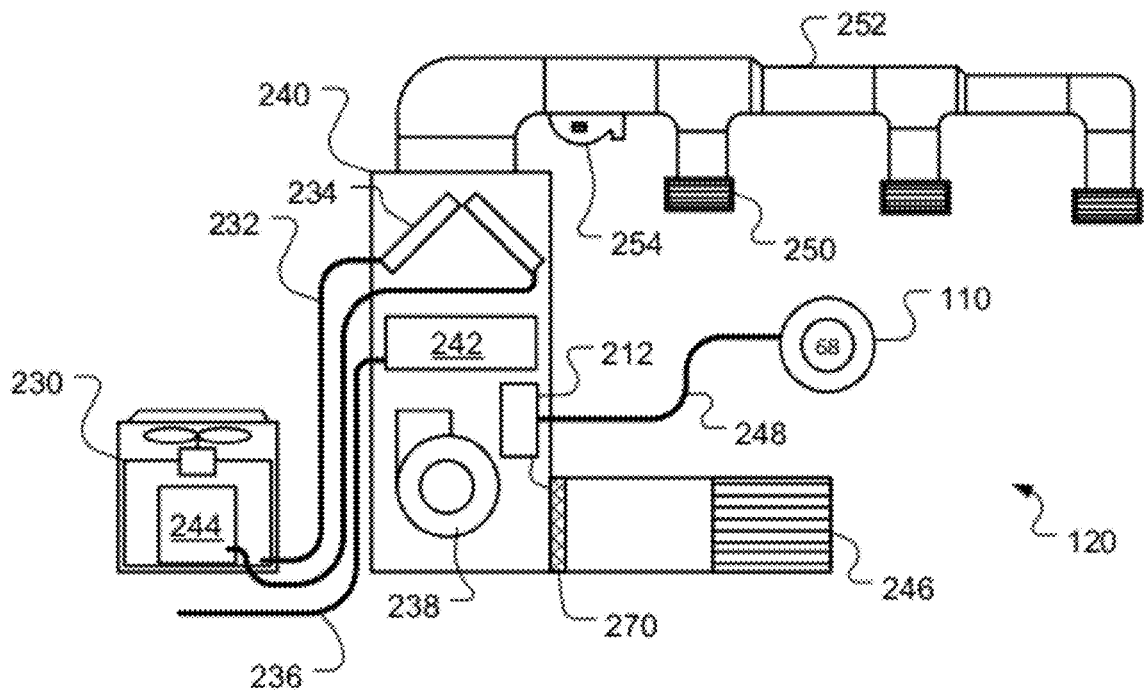
FIG. 2 is a schematic diagram of an HVAC system controlled using a thermostat designed in accordance with embodiments of the present invention.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
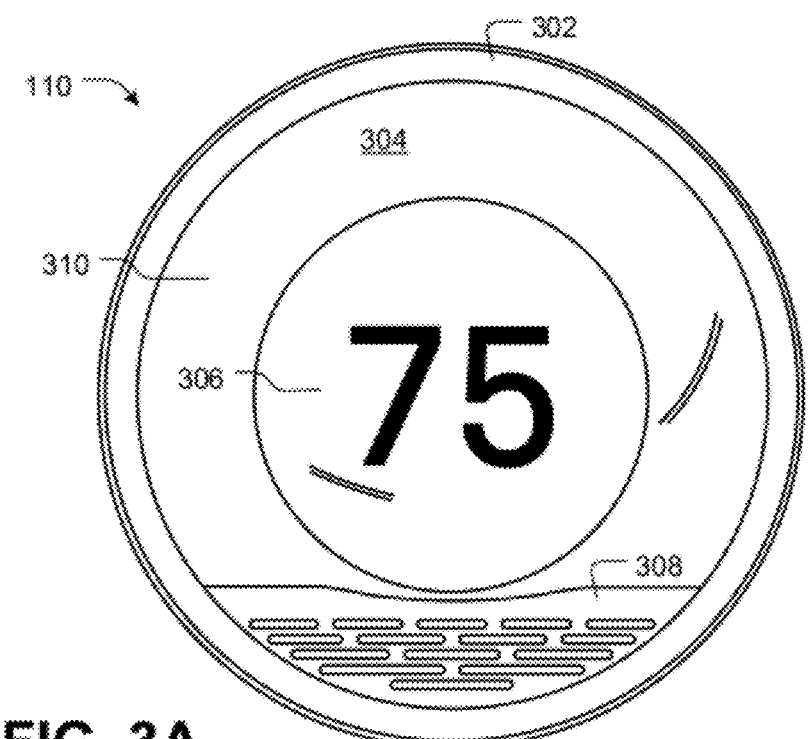
FIGS. 3A-3B illustrate a forward-facing surface and display of a thermostat designed in accordance with embodiments of the present invention.
Figure 3B:
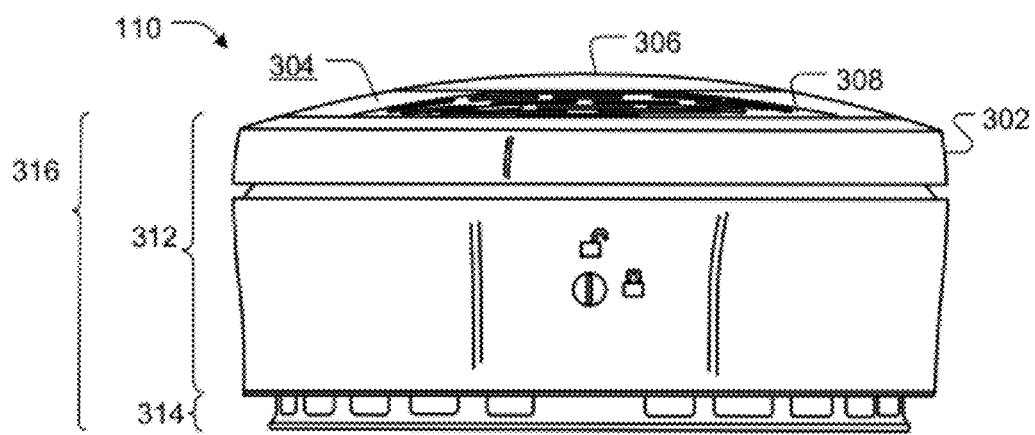

FIGS. 3A-3B illustrate a thermostat designed in accordance with embodiments of the present invention. Inside of thermostat 110 is control circuitry that electrically connects thermostat 110 to an HVAC system, such as HVAC system 120 shown in FIG. 1 and FIG. 2. One or more microprocessors (not shown) inside thermostat 110 are available to perform various computations including a backplate processor in backplate 314 for processing information related to the operation and control of HVAC system 120. Another head unit processor (not shown) may be used to control the display and user interface portion in the head unit 312 portion of thermostat 110 and the network protocol. A network interface controller or NIC (not shown) is also provided within thermostat 110 enabling wireless communication over a private network such as a LAN and public networks or wide area networks (WANs) such as the Internet.

In the embodiment illustrated, thermostat 110 is enclosed by housing 316 with a forward-facing surface including a cover 304 and a grille member 308. The grille member 308 is designed to compliment the sleek, simple, uncluttered and elegant design of thermostat 110 to while facilitating the integration and operation of sensors located within housing 316 of the thermostat. Notably, included in the thermostat according to some preferred embodiments is passive infrared (PIR) occupancy sensors and temperature sensors behind grille member 308. Additional sensors may also include an ambient light sensor (not shown) and an active proximity sensor (not shown) positioned near the top of the thermostat just behind the cover 304. Some embodiments of housing 316 include a backplate 314 and a head unit 312. Housing 316 provides an attractive and durable configuration for one or more integrated sensors used by thermostat 110 and contained therein.

A central display area 306 of cover 304 allows information related to the operation of the thermostat to be displayed while an outer area 310 of cover 304 may be made opaque using a paint or smoke finish. For example, central display area 306 may be used to display a current temperature as illustrated in FIG. 3A with the numerals, "75" indicating 75 degrees. Central display area 316 may also be used to display wireless networks available within enclosure 100 and present a user-interface for configuring thermostat 110 to select, access and use one of the wireless networks.

Embodiments of thermostat 110 are circular in shape and have an outer ring 312 for receiving user input. Side view of thermostat 110 in FIG. 3B further highlights this curved spherical shape of cover 304 and grille member 308 gently arcing outward matching the corresponding surface portion of outer ring 302. In some embodiments, the curvature of cover 304 may tend to magnify information displayed in central display area 306 thus making information easier to read by users. The shape of thermostat 110 not only provides a visually appealing accent when it is mounted on the wall but a natural shape for users to touch and adjust with their hands. Accordingly, the diameter of thermostat 110 may be approximately 80 mm or another diameter that readily fits the hand. In various embodiments, rotating outer ring 302 allows the user to make adjustments, such as selecting a new target temperature. For example, the target temperature may be increased by rotating the outer ring 302 clockwise and decreased by rotating the outer ring 302 counter-clockwise.

Operation of the microprocessors, wireless NIC and other electronics are powered by a rechargeable battery (not shown) located within the thermostat 110. In some embodiments, the battery is recharged directly using 24 VAC power off a "C" wire drawn from the HVAC system or a AC-DC transformer coupled directly into the thermostat 110. Alternatively, one or more different types of energy harvesting may also be used to recharge the internal battery if these direct methods are not available as described, for example, in U.S. Ser. No. 13/034,678, supra, and U.S. Ser. No. 13/267,871, supra. Embodiments of the present invention communicate and operate the thermostat 110 in a manner that promotes efficient use of the battery while also keeping the thermostat operating at a high level of performance and responsiveness controlling the HVAC system. Some embodiments may use the battery-level charge and the priority or relative importance of a communication to determine when a thermostat management system located on a public network such as the Internet may communicate with the thermostat 110. Further details on the communication methods and system used in accordance with these embodiments are described in detail later herein.

Figure 4A:
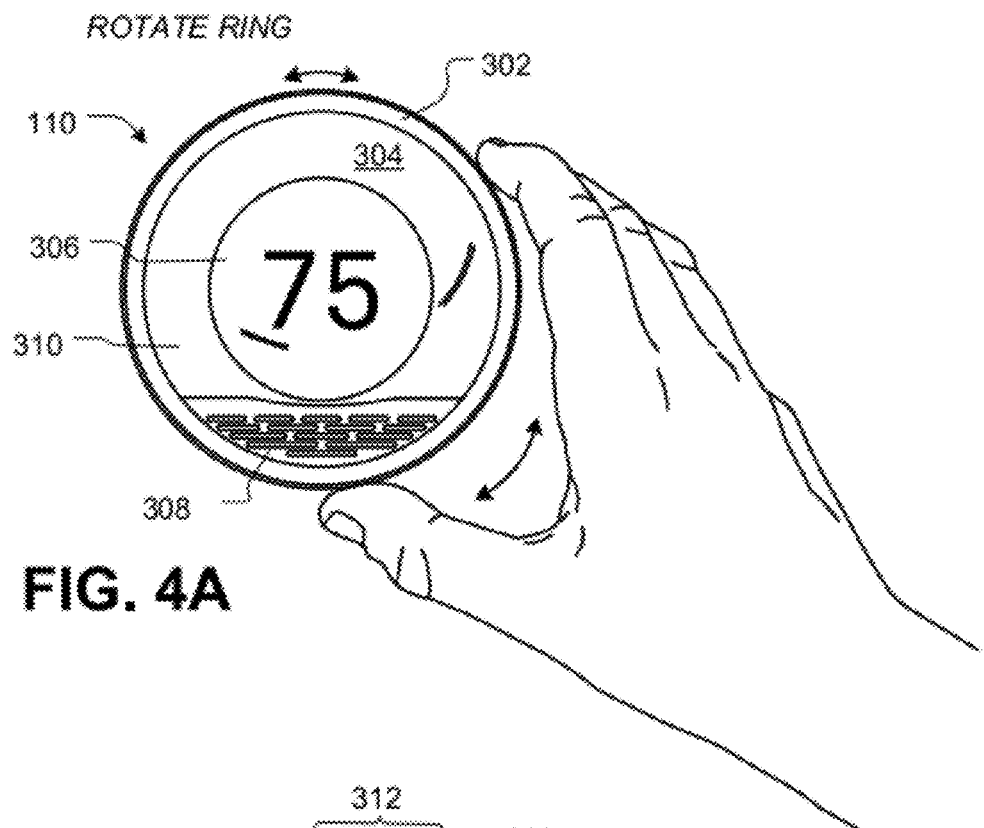
FIGS. 4A-B illustrate a user's hand controlling a thermostat designed in accordance with embodiments of the present invention.
Figure 4B:
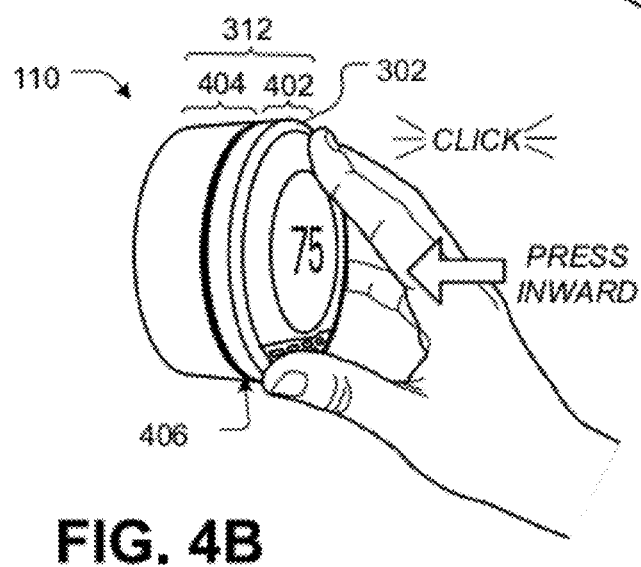

FIGS. 4A-B illustrate a user's hand controlling a thermostat designed in accordance with embodiments of the present invention. As illustrated, thermostat 110 is wall-mounted, circular in shape and has a rotatable outer ring 302 for receiving user input. Cover 304 on thermostat 110 includes central display area 306 for providing information and feedback to the user before, during and after operating thermostat 110. In some embodiments, outer area 310 of cover 304 delineates an area for the user to push or otherwise manipulate thermostat 110 and thus is made opaque with paint or smoke finish.

Head unit 312 of thermostat 110 slides on to backplate (not shown) and further includes head unit front 402 and head unit frame 404. The head unit front 402 includes outer ring 302, central display area 306 and outer area 310 of cover 304 and grille member 308 designed in accordance with embodiments of the present invention.

According to some embodiments, for the combined purposes of inspiring user confidence and further promoting visual and functional elegance, the thermostat 110 is controlled by only two types of user input, the first being a rotation of the outer ring 302 as illustrated in FIG. 4A (also referred to as a "rotate ring"), and the second being an inward push on the head unit front 402 until an audible and/or tactile "click" occurs as illustrated in FIG. 4B. According to some embodiments, the inward push illustrated in FIG. 4B only causes the outer ring 302 to move forward, while in other embodiments the entire head unit front 402 moves inwardly together when pushed. In some embodiments, cover 304 and grille member 308 do not rotate with outer ring 302.

According to some embodiments, multiple types of user input may be generated depending on the way a pushing inward of head unit front 402 is effectuated. In some embodiments a single brief push inward of head unit front 402 until the audible and/or tactile click occurs followed by a release (single click) can be interpreted as one type of user input (also referred to as an "inward click"). In other embodiments, pushing the head unit front 402 in and holding with an the inward pressure for an amount of time such as 1-3 seconds can be interpreted as another type of user input (also referred to as a "press and hold"). According to some further embodiments, other types of user input can be effectuated by a user such as double and/or multiple clicks, and pressing and holding for longer and/or shorter periods of time. According to other embodiments, speed-sensitive or acceleration-sensitive rotational inputs may also be implemented to create further types of user inputs (e.g., a very large and fast leftward rotation specifies an "Away" occupancy state, while a very large and fast rightward rotation specifies an "Occupied" occupancy state).

Figure 5:
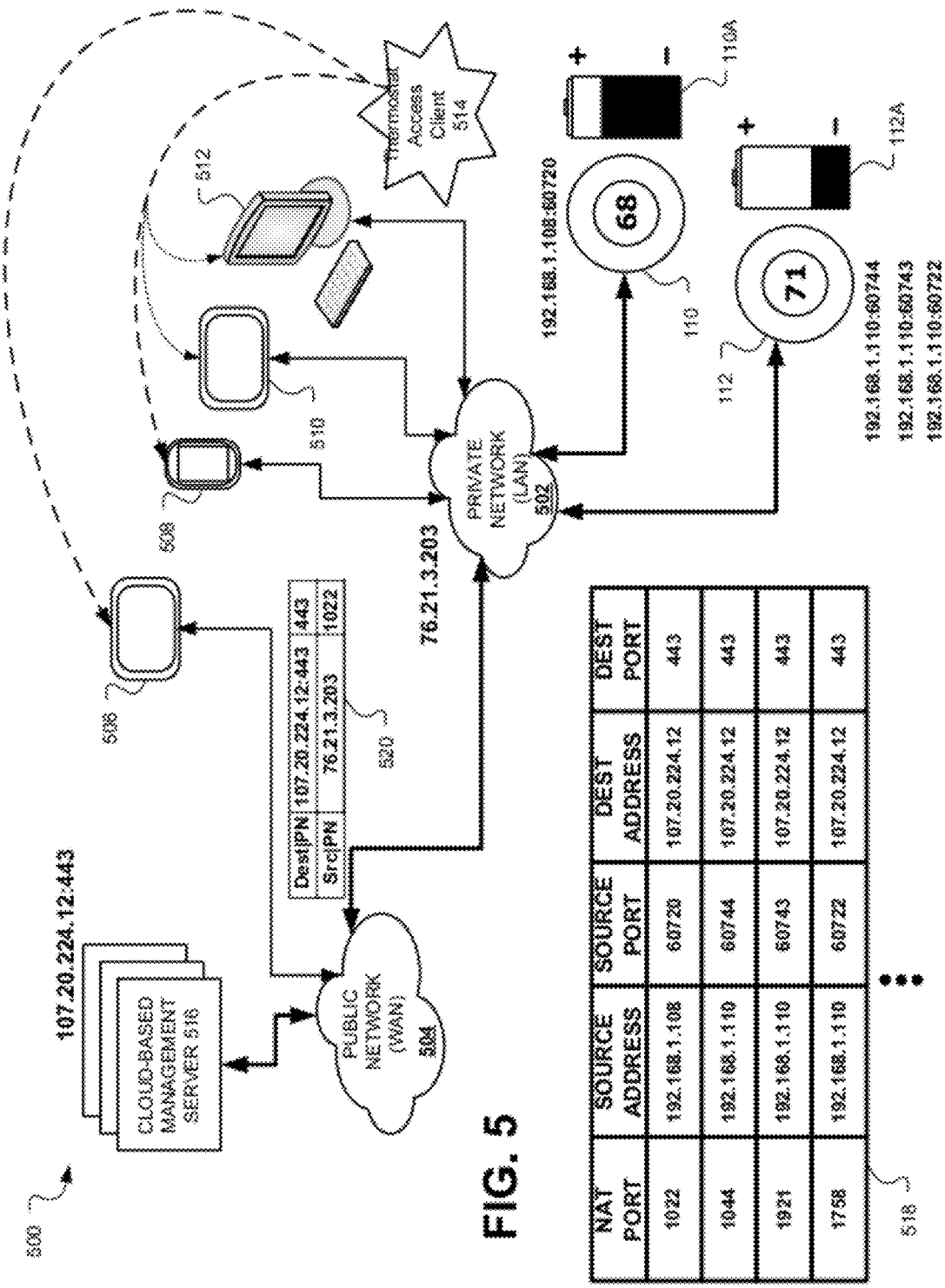
FIG. 5 illustrates thermostats and computers on a private network connected to a thermostat management system designed in accordance with embodiments of the present invention.

FIG. 5 illustrates thermostats and computers on a private network 502 connected to a cloud-based management server 516 designed in accordance with aspects of the present invention. In one embodiment, private network 502 is designed to provide network connectivity primarily within and near an enclosure, such as enclosure 100 in FIG. 1, connecting various devices together such a Smartphone 508, tablet 510, computer 512, thermostat 110 and remote thermostat 112. A router (not shown) in private network 502, such as integrated router 122 in FIG. 1, provides wired and wireless connectivity between these devices using a network protocol such as TCP/IP. Preferably, thermostat 110 and remote thermostat 112 are connected wirelessly to private network 502 as a wired connection in the vicinity of the thermostats may not available and/or it is undesirable to include a wired connection socket on thermostat 110 or remote thermostat 112.

Thermostat access client 514 is a client application designed in accordance with aspects of the present invention to access a cloud-based management server 516 over public network 504. The term "thermostat management system" can be interchangeably referenced as a "cloud-based management server" for the thermostats, or more simply "cloud server", in various descriptions hereinabove and hereinbelow. Because thermostat access client 514 is designed to execute on different devices, multiple client applications may be developed using different technologies based on the requirements of the underlying device platform or operating system. For some embodiments, thermostat access client 514 is implemented such that end users operate their Internet-accessible devices (e.g., desktop computers, notebook computers, Internet-enabled mobile devices, cellphones having rendering engines, or the like) that are capable of accessing and interacting with the cloud-based management server 516. The end user machine or device has a web browser (e.g., Internet Explorer, Firefox, Chrome, Safari) or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). The server side of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile. It is to be appreciated that although the TCP/IP protocol is set forth as the network protocol used for communications among the cloud-based management server 516, the thermostat access client 514, and other devices for some embodiments, it is set forth by way of example and not by way of limitation, with the use of any other suitable protocol, such as UDP over IP in particular, may be used without departing from the scope of the present teachings. In yet another embodiment, thermostat access client 514 may be a stand-alone application or "app" designed to be downloaded and run on a specific device such Smartphone 508 or table 510 device running the Apple iOS operating system, Google Android operating system or others.

It is to be appreciated that the embodiments described herein, while advantageously providing battery-conscious methods for reliable communication of thermostatically related data between the thermostats 110/112 and the cloud-based management server 516, are also advantageously configured to be compatible with a large variety of conventional integrated routers that service a large population of homes and businesses. Thus, by way of example only and not by way of limitation, the router (not shown) that services the private network 502 can be, for example, a D-Link DIR-655 Extreme N Wireless Router, a Netgear WNDR3700 RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router.

In one embodiment, cloud-based management server 516 illustrated in FIG. 5 may be accessed over public network 504 by computer devices on private network 502 running thermostat access client 514. Thermostat access client 514 may also execute or run on a computer device such as tablet 506 directly connected to the public network 504. Preferably, each thermostat access client 514 has access to a thermostat management account (not illustrated) on cloud-based management server 516 which allows thermostat access client 514 to interact with thermostat 110 or remote thermostat 112 in a variety of different ways. In some embodiments, thermostat access client 514 may be used to access sensor data previously collected from thermostat 110 and remote thermostat 112 then stored on cloud-based management server 516. In other embodiments, for example, thermostat access client 514 may be used to either remotely control or remotely configure thermostat 110. Thermostat access client 514 may also gather other information on thermostat 110 or remote thermostat 112 including a battery-level readings, firmware update levels, diagnostic data, or any other data exposed by the thermostats to thermostat access client 514.

Each of the thermostat 110 and remote thermostat 112 also communicate with cloud-based management server 516 through one or several communication channels established through public network 504. Like other devices on the private network 502, thermostat 110 and remote thermostat 112 do not have a public network address and therefore cannot communicate directly on the Internet or other public network without the assistance of the router and corresponding entries in NAT table 518. In the example in FIG. 5, thermostat 110 has a private network address of 192.168.1.108 and a private port number of 60720 while remote thermostat 112 has been configured with a private network address of 192.168.1.110 and three different port numbers 60744, 60743, and 60722. In this example, thermostat 110 initiates the establishment of a communication channel with cloud-based management server 516 having a public network address 107.20.224.12 and public port number 443. Accordingly, the router (not shown) on private network 502 creates an entry in a NAT table 518 identified by NAT PORT 1022 for communications between SOURCE ADDRESS 192.168.1.108 and SOURCE PORT 60720 of thermostat 110 and DESTINATION ADDRESS 107.20.224.12 and DESTINATION PORT 443 of cloud-based management server 516.

In an alternative configuration, thermostats 110 and 112 may be configured with multiple communication channels to cloud-based management server 516 rather than a single connection as depicted with thermostat 110. As an example, thermostat 112 initiates the establishment of communication channels over three ports 60744, 60743, and 60722, causing the router to make three more entries in the NAT table 518 identified by NAT PORTs 1044, 1921 and 1758. The additional corresponding entries in NAT table 518 identified as NAT PORT 1044, 1921, and 1758 include SOURCE ADDRESS 192.168.1.110 and SOURCE PORTS 60744, 60744, 60722 each associated with DESTINATION ADDRESS 107.20.224.12 and DESTINATION PORT 443 of cloud-based management server 516. In various embodiments of the present invention, communications between cloud-based management server 516 and other thermostats may take place over a single communication channel as configured on remote thermostat 110 while other embodiments may use multiple communications channels as provided with thermostat 112.

As data is transferred using a protocol such as TCP/IP, the router in private network 502 modifies the addresses in packets of data passing over the communication channels between the private network and a server or device on the public network such as cloud-based management server 516. In one example, the router may receive a packet from remote thermostat 110 having a SOURCE ADDRESS field of 192.168.1.108 and a SOURCE PORT of 60720 combined with a DEST ADDRESS of 107.20.224.12 and DEST PORT 443 of cloud-based management server 516. Before placing this packet on the Internet, the router references NAT table 518 and replaces the SOURCE ADDRESS field and SOURCE PORT field values with the public address 76.21.3.203 assigned to the router and the corresponding NAT port 1022 respectively. A resulting modified packet header 520 in FIG. 5 sent over the public network has the original destination address and destination port but the source address and port are changed to the public address of the router and port number from NAT table 518. As long as the entries in NAT table 518 are present, thermostats 110 and 112 may communicate over their respective communication channels on the public network 504 to cloud-based management server 516.

During these communications, embodiments of the present invention take into consideration battery-levels of the thermostats and the impact on the performance of the thermostat. If a battery-level on a thermostat is low, further communications with a thermostat may impact the ability of the thermostat to perform essential functions such as controlling the HVAC system or communicating over the network. As illustrated in FIG. 5, an enlarged battery image 110A next to thermostat 110 shows schematically a battery-level of the battery inside of thermostat 110. The battery image 110A, in this example, appears about 80% charged thus representing the battery-level inside thermostat 110 to be almost fully charged. In a similar manner, an enlarged battery image 112A adjacent to remote thermostat 112 appears about 20% charged thus indicating that the battery inside of thermostat 112 has a low battery-level. To accommodate for these different and fluctuating battery-levels, embodiments of the present invention may incorporate one or multiple different strategies in communicating and operating a thermostat.

Figure 6A:
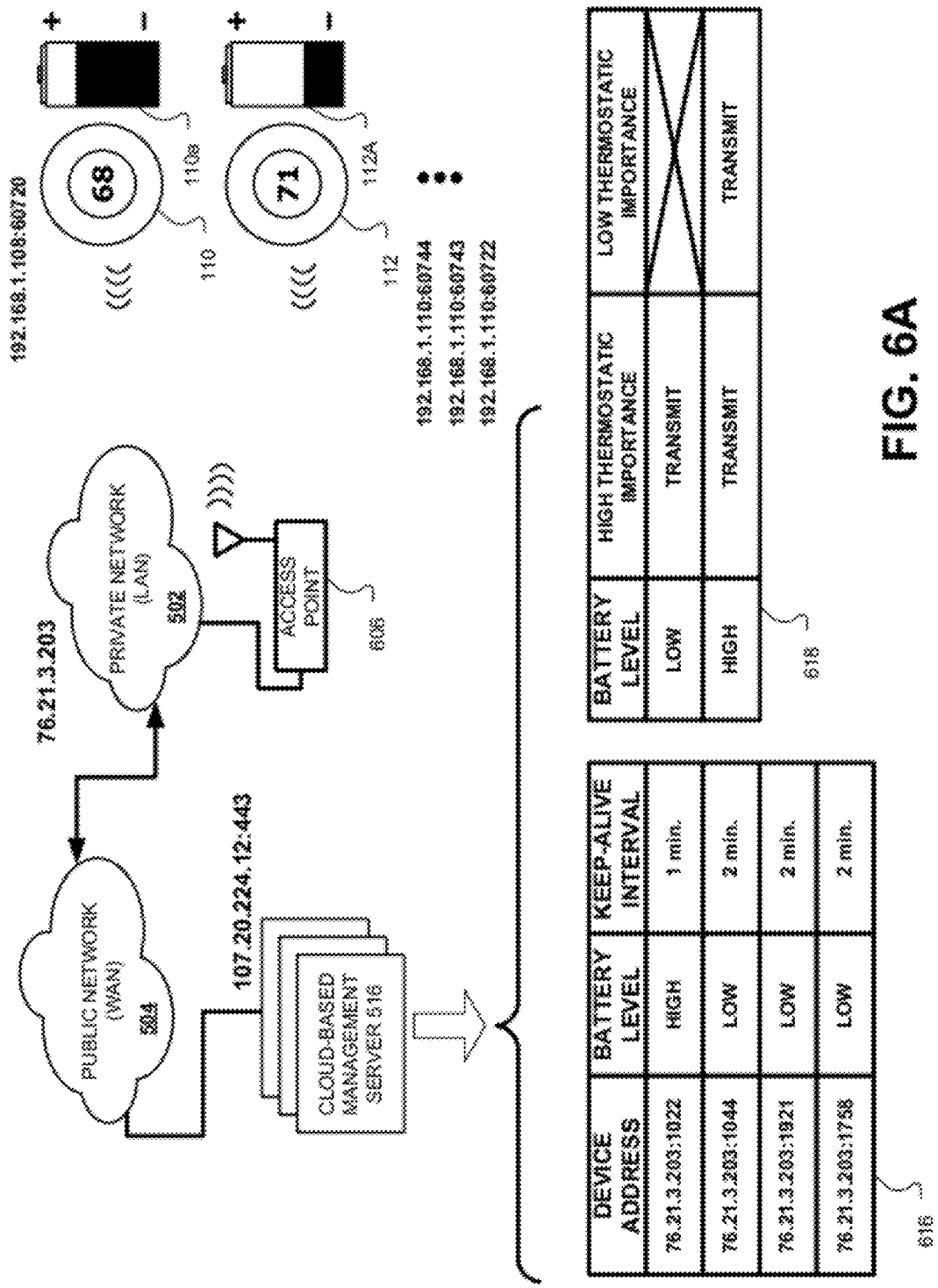
FIG. 6 illustrates a thermostat communication server that controls communications using a data priority assigned to the data and a battery-level on a thermostat in accordance with embodiments of the present invention.

In one embodiment illustrated in FIG. 6A, cloud-based management server 516 monitors battery-levels on the thermostats and judiciously control the communications according to a priority assigned to the data. In some embodiments, cloud-based management server 516 implements aspects of the present invention however alternate embodiments may distribute functionality from cloud-based management server 516 to one or several servers within the system. In this example, thermostat 110 and thermostat 112 have initiated and established their respective communication channels with cloud-based management server 516 and the router on private network 502 has created NAT table 518 as previously illustrated in FIG. 5. To preserve battery-charge, the thermostats 110/112 may enter into a low power state while waiting for either (i) a local event that merits wake-up, such as a particular temperature threshold being detected by the temperature sensors, or a detected proximity of a user detected by the proximity sensors, or (ii) a next event or request from cloud-based management server 516 that merits wake-up.

Prior to entering into a low power state, each thermostat 110/112 sends a connection-opening long-polling packet to the thermostat communication server 620. When a response is not required for normal operational purposes (i.e., when the cloud-based management server 516 has no instructions or requests to render), cloud-based management server 516 maintains a long-polling communication with thermostats 110/112 allowing the communication channels to remain open even though the actual data exchanged may be infrequent or subject to long delays. This not only uses the battery-charge of the thermostats more efficiently but reduces the overhead and delay associated with reestablishing a communication channel for each data transmission. In one embodiment, cloud-based management server 516 maintains the long-polling communication in a manner that preserves the entry in NAT table 518 by sending a keep-alive priority packet at regular keep-alive intervals. In one embodiment, the keep-alive priority packet is consistent with a keep-alive facility built into a TCP/IP protocol stack. If no messages need to otherwise be sent to the thermostats 110/112 within the long-polling time interval, the protocol stack sends one or more "keep-alive" packets to the router on private network 502 at respective keep-alive intervals that are less than the long-polling time interval, thereby preserving the entry in NAT table 518. Preferably, the keep-alive intervals are substantially less than the interval over which many common routers might otherwise flush their NAT table with respect to that particular connection.

At a predetermined time interval or upon an event occurrence, thermostats 110 and 112 may wake from a low power state to check on their respective battery-levels and perform other administrative functions. In accordance with some embodiments, the battery-level is transmitted over a wireless connection from each thermostat 110 and 112 through an access point 606 on the private network and then stored for future reference by thermostat communication server 620. For example, battery image 110A appears about 80% charged representing the battery-level inside thermostat 110 to be almost fully charged while battery image 112A appears about 20% charged thus indicating that the battery inside of thermostat 112 is at a low level. One embodiment of cloud-based management server 516 updates this data in a device-battery-charge table 616 that includes a device address, a battery-level, and a keep-alive interval used for the corresponding communication channel. For example, device-battery-charge table 616 provides that device address 76.21.3.203:1022 (corresponding to thermostat 110 by way of NAT table 518) has a "high" battery-level and a keep-alive interval set to 5000 time units. In contrast, device addresses 76.21.3.203:1044, 76.21.3.203:1921, and 76.21.3.203:1758 (corresponding to thermostat 112 by way of NAT table 518) in device-battery-charge table 616 all have a "low" battery-level and a longer keep-alive interval set to 10000. Some embodiments of cloud-based management server 516 may set the keep-alive interval shorter if the battery-level is high to reduce the chance that an entry in the NAT table 518 will be flushed by the router. If the battery-level is "low", the keep-alive interval may be set to a maximum long-poll interval that represents a maximum time interval not likely to exceed a NAT time-out period of most router devices.

Some embodiments of cloud-based management server 516 may further use device-battery-charge table 616 to help determine when data should be communicated from cloud-based management server 516 to one or more thermostats. To implement, one embodiment further creates a power-priority table 618 that associates low and high battery-levels reported from each thermostat with high thermostatic importance data or low thermostatic importance data. In these embodiments, power-priority table 618 establishes a trade-off between the importance assigned to data being communicated compared with the drain on the current battery charge associated with the thermostat. For example, data communications with data classified as high thermostatic importance data may be filtered and transmitted even when the battery is low since the data is considered of higher importance to the overall operation of cloud-based management server 516 and the thermostat. In one embodiment, a low battery-level may be between 0 and 39% of charge capacity.

Data communications classified under a low thermostatic importance may note be transmitted when the battery level is low as indicated in power-priority table 618. Since the battery is not fully charged, low thermostatic importance data may not be transmitted in accordance with power-priority table 618 to preserve energy on the battery of the thermostat. Accordingly, low and high thermostatic importance data types are transmitted in accordance with some embodiments when the battery-level is detected as high or in a range from 80% to 100% charged.

Figure 6B:
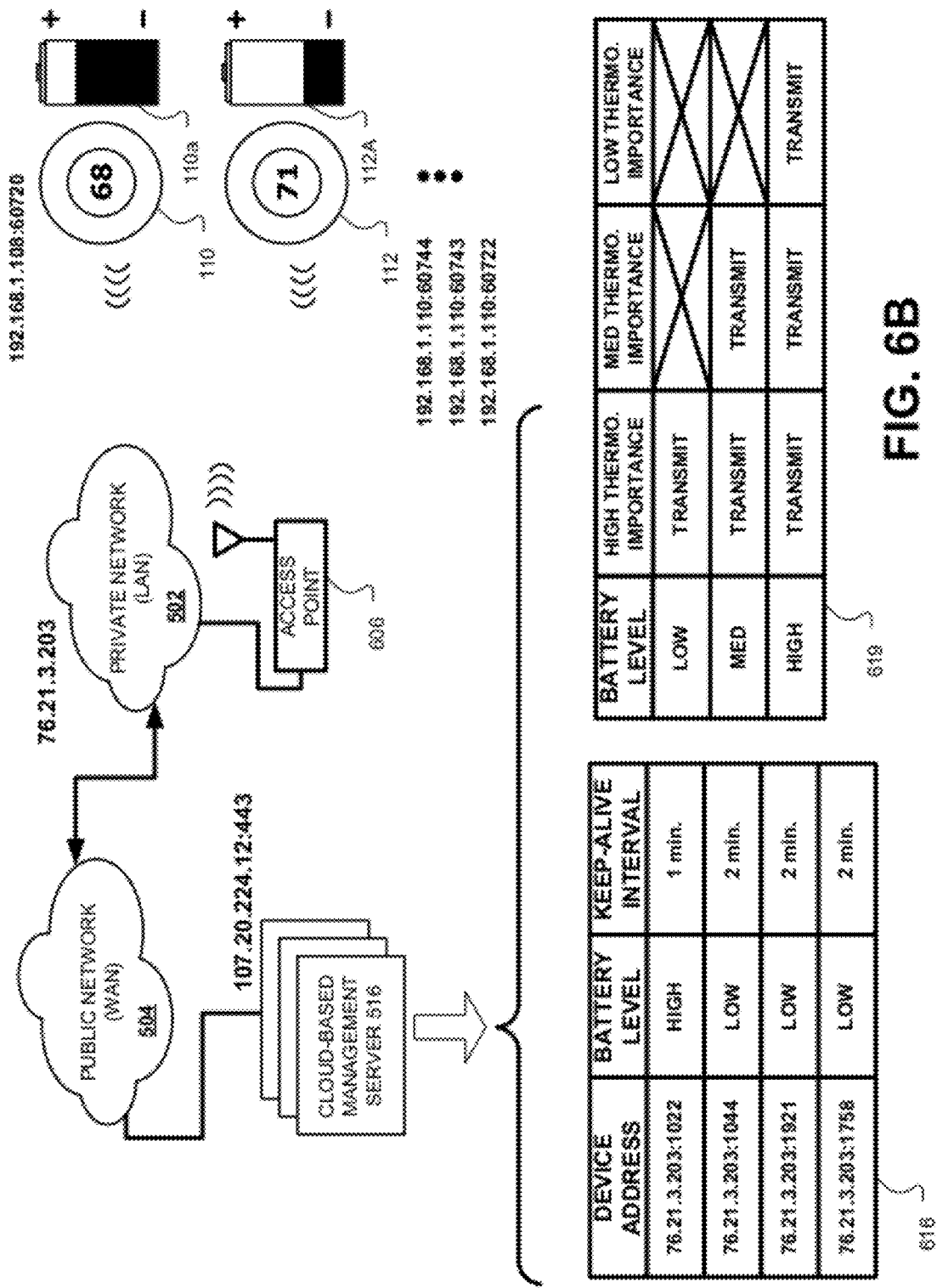

In an alternate embodiment illustrated in FIG. 6B, power-priority table 618 three battery levels and three levels of thermostatic importance. In the case of a low battery level, data consider to be high thermostatic importance is transmitted while medium and low thermostatic importance data is not sent. When the battery level is at a medium level, data considered of both high and medium thermostatic importance is transmitted. If the battery level is at least at a high level then data considered to be of low, medium and high thermostatic importance is transmitted. Further additional embodiments may also use more than three battery-levels and three data priority level types for the data as well depending on the particular design and implementation requirements. In addition, the percentage charge for low, medium and high battery-levels may include different ranges of charge that do not necessarily include the aforementioned 0-39% charge for a low battery-level, 40% to 79% for a medium battery-level, and 80% to 100% for a high battery-level.

In some embodiments, the data communications may be classified in a number of different ways and often will be determined based on the particular implementation requirements of the cloud-based management server 516 and performance requirements for the thermostats. In one implementation, a high-priority data type may include data communications actively requesting a thermostat perform some function. This may include a data communication from cloud-based management server 516 requesting thermostat 110 or 112 to change a temperature setpoint. Another high-priority data type may include a data communication requesting thermostat 110 or 112 to turn on or turn off a cooling function. In contrast, low-priority data types may include certain operations or functions deemed less critical for a thermostat to perform immediately. Downloading a software update from cloud-based management server 516 to a thermostat is one example of a low-priority communication as the software update is not required and likely does not affect the immediate operation of the thermostat. In addition, it may also be preferred to not download a software update when a thermostat has a low battery-level as a partially-completed update may render the thermostat inoperable.

Figure 7:
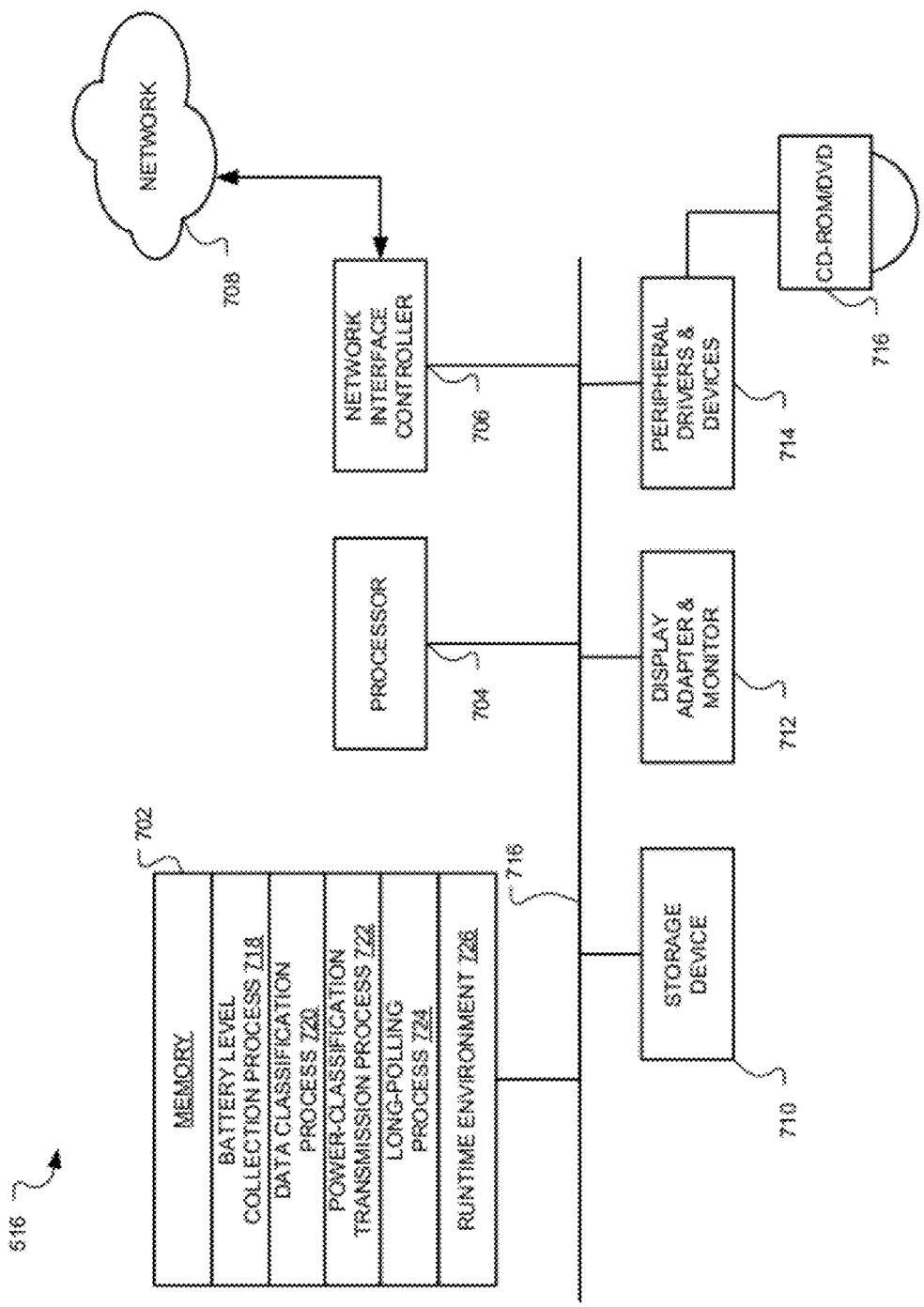
FIG. 7 illustrates a thermostat communication server portion of the thermostat management system that both conserves energy and promotes high-performance operation of a thermostat in accordance with embodiments of the present invention.

FIG. 7 illustrates a cloud-based management server 516 that both conserves energy and promotes high-performance operation of thermostats designed in accordance with embodiments of the present invention. In this embodiment, cloud-based management server 516 includes a processor 704 configured to execute one or more instructions, a memory 702 holding instructions executable on the processor, a network interface controller 706 capable of communication over a network such as the Internet, a storage device 710, a display adapter and monitor 712 to display information from the server on the monitor, and peripheral drivers & devices 714 that includes keyboards, mice and other interfaces for controlling the server. For example, a CD-ROM/DVD device 716 with media may be attached to peripheral drivers & devices 714 holding various embodiments of the present invention tangibly embodied in a computer program product.

In one embodiment, processes in memory 702 may include a battery-level collection process 718 that stores a battery-level associated with the battery used to power a thermostat. As previously described, the battery-level in some embodiments is provided by the thermostat over a communication channel established over a network between the thermostat management system and the thermostat and provides an indication of remaining energy in the battery associated with the thermostat. The battery-level collection process is able to collect these battery-levels over a long period of time as a result of ongoing communications between the thermostat and the cloud-based management server 516, which includes the long-polling process that keeps the communication channels open between the cloud-based management server 516 and thermostats. In some embodiments, the battery-level data is stored in a device-battery-charge table 616 as illustrated in FIG. 6 and may be in a local storage area on cloud-based management server 516 or remotely accessed in a database or other remote storage area.

Some embodiments may further include a data priority process 720 in memory 702 that classifies and prioritizes one or more types of data to be transmitted to the thermostat over a communication channel. Depending on the implementation, data priority process 720 classifies the data transmission according to a data priority ranging from a low thermostatic importance data type to a high thermostatic importance data type. In some implementations, the low thermostatic importance data is of lesser importance to the operation of the thermostat management system and the thermostat. For example, a low thermostatic importance data type may include a software update as the software update may not be required for the thermostat to operate. In comparison, high thermostatic importance data types may include data of higher importance to the operation of the thermostat management system such as a request to change a setpoint in a thermostat or turn-on heating or cooling in the HVAC system.

Further embodiments may also include a power-classification transmission process 722 that transmits data to a thermostat depending on a classification of the data and the battery-level associated with the thermostat. As previously described, the data priority classification ranges from a low thermostatic importance data type to a high thermostatic importance data type depending on the importance of the data to the overall operation of cloud-based management server 516 and the thermostat. Consequently, low thermostatic importance data may not be transmitted when a battery-level is low in order to conserve the battery power remaining on the thermostat. However, the power-classification transmission process 722 may transmit all data classifications when the battery-level associated with a thermostat is fully-charged or "high".

Embodiments of the present invention may also include a long-polling process 724 in memory 702 to facilitate keeping the communication channel open with a thermostat. This long-polling process 724 initially receive receives a request over the network from a thermostat to establish the communication channel between the cloud-based management server 516 located on a public network and the thermostat located on a private network. In some embodiments, cloud-based management server 516 has a public network address registered on the Internet while the thermostat has a shared public network address provided through an entry in a NAT table from a router on a private network, such as NAT table 518 in FIG. 5. The long-polling process 724 further configures a network communication protocol, such as TCP/IP, to occasionally transmit a keep-alive packet from the thermostat management system back to the network-attached thermostat over the communication channel. In some implementations, the keep-alive packet sent to the thermostat acknowledges establishment of the communication channel but may not include a payload or data that needs processing. Long-polling process 724 may set the time interval for sending these keep-alive packets at maximum time interval not to exceed a NAT time-out period of a router device. The receipt of the keep-alive packet before the NAT time-out period keeps the entry in the NAT table current and the communication channel from being disconnected.

Figure 8A:
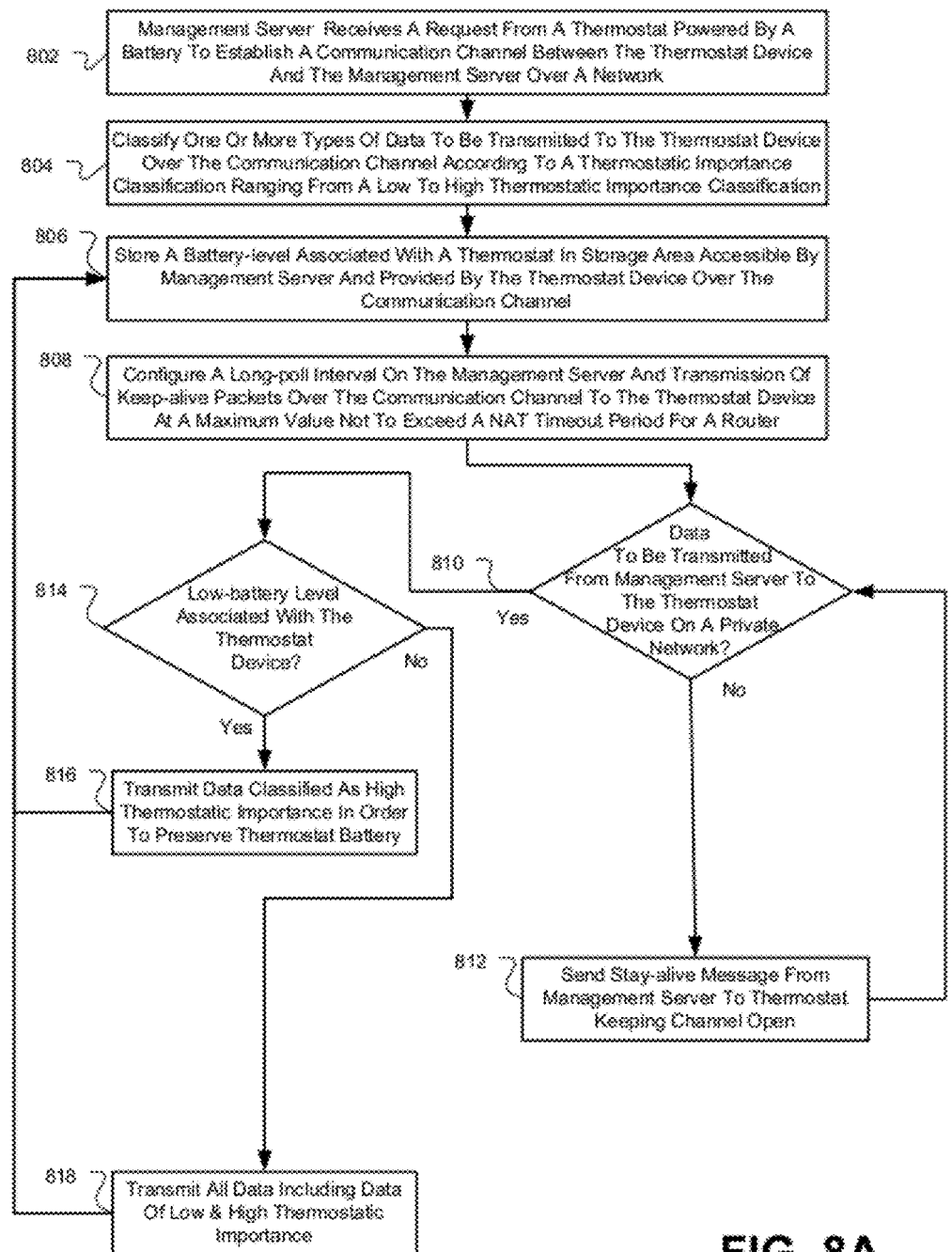
FIG. 8A illustrates a flowchart diagram of the operations that a thermostat communication server uses to communicate with a battery powered thermostat while conserving battery energy and promoting thermostat performance in accordance with embodiments of the present invention.

FIG. 8A illustrates a flowchart diagram of the operations that a thermostat communication server uses to coordinate communications with a battery powered thermostat that both conserves the energy of the battery and promotes performance of the thermostat. The thermostat communication server, such as cloud-based management server 516 in FIG. 6, receives a request from a thermostat powered by a battery to establish a communication channel between the thermostat and the thermostat communication server over a network. (802) When the thermostat initiates the communication channel, a router places an entry in a NAT table, such as NAT table 518 in FIG. 5, allowing the thermostat on a private network behind a router to then communicate with thermostat communication server on the Internet, a public network. The entry in the NAT table will not be removed and the communication channel will remain open as long as any gap in communication from the thermostat communication server and the thermostat does not exceed a NAT time-out value associated with router.

Next, thermostat communication server classifies one or more types of data to be transmitted to the thermostat over the communication channel according to a thermostatic importance ranging from a low thermostatic importance to a high thermostatic importance classification. (804) In one implementation, the low thermostatic importance data type includes data of lesser importance to the operation of the overall thermostat management system and thermostat. These may include optional functions to be performed on the thermostat such as software update or other maintenance. Conversely, the high thermostatic importance data type includes data of higher importance to the operation of the thermostat management system and the thermostat and generally includes requests to actively perform an action on the thermostat such as changing a setpoint, turning-on/off heating or cooling or checking ambient temperature in a residence or commercial location where the thermostat is located.

Next, thermostat communication server stores a battery-level associated with a thermostat in a storage area accessible by the thermostat communication server. (806) In some embodiments, each thermostat periodically checks its own battery and provides the battery-level to the thermostat communication server over a communication channel established over the network. Battery-level information for each thermostat may be stored in a device-battery-charge table, such as device-battery-charge table 616 as illustrated in FIG. 6.

To keep the communication channel open, thermostat communication server may configure a long-poll interval for transmitting a keep-alive packet over the communication channel to the thermostat. (808) In some embodiments, the thermostat communication server sets the long-poll interval to a maximum value not to exceed a NAT timeout period used by most routers, which is often approximately 100 minutes.

If no data passes between thermostat communication server and the thermostat (810-No), a timer value, originally set to the long-poll interval, decreases over time within the communication protocol stack and the process continues. Eventually, if the long-poll interval runs out of time and the communication protocol stack on the thermostat communication server, such as TCP/IP, does not detect communication activity within the long-poll interval, the built-in keep-alive feature sends a packet to keep the NAT entry on the router and communication channel open. (812) In some embodiments, the thermostat communication server may request to terminate the communication channel when the long-poll interval has elapsed and wait for new communication channel to be established by the thermostat.

Alternatively if there is data to be sent, the thermostat communication server checks the most recent battery-level of the thermostat before sending. (810-Yes) One embodiment determines if there is a low battery-level associated with the thermostat (814-Yes) that only data classified as high thermostatic importance data should be transmitted. (816) This preserves some of the battery charge in the thermostat by not sending low thermostatic importance data. In some embodiments, thermostat communication server have predetermined classifications setup in advance according to a particular configuration requirement. If the data is of higher importance to the operation of the thermostat management system then the data is classified as a high thermostatic importance data type and should be sent even when there is a low battery-level. For example, high thermostatic importance data may include instructions sent to a thermostat actively requesting the thermostat change a temperature setpoint or other setting.

When the battery-level associated with the thermostat is not at a low level (814-No), all data classified as low to high thermostatic importance will be transmitted as the battery on the thermostat is considered fully charged. (818)

Figure 8B:
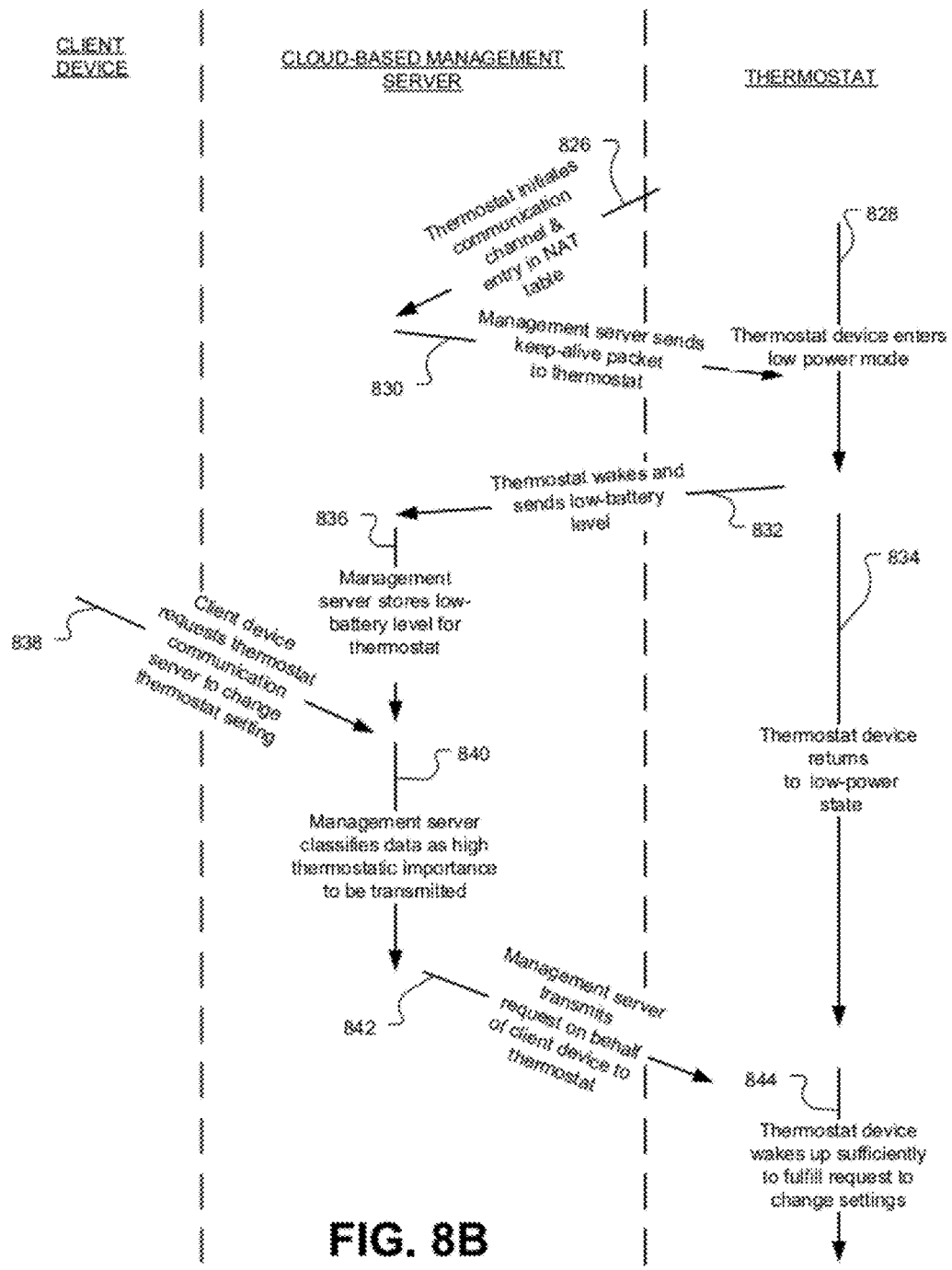
FIG. 8B is a data flow chart that illustrates the flow of data and events when thermostat communication server transmits data based on a battery-level of a thermostat and data priority type associated with the data in accordance with embodiments of the present invention.

An example data flow chart in FIG. 8B illustrates the flow of data and events when thermostat communication server transmits data based on a battery-level of a thermostat and priority associated with the data. In this example, the thermostat initiates establishment of a communication channel with thermostat communication server causing a router to creates entry in the NAT table. (826) To save energy, the thermostat enters a low power mode and waits for the next event. (828). After a period of time, the management server sends a keep-alive packet before the NAT table entry is removed. (830) In one embodiment, the thermostat wakes from the low power mode and sends a low battery-level to the thermostat communication server indicating the battery-level on the thermostat is nearly discharged (832)—the thermostat then returns to a low power mode to conserve the battery use. (834) Thermostat communication server associates the low battery-level with the thermostat and stores the results in a storage area. (836) At this point, a client device, such as tablet 506 running thermostat access client 514 in FIG. 5, requests thermostat communication server to change a thermostat setting. (838) Thermostat communication server classifies request as a high thermostatic importance data type to be transmitted even though the battery on the thermostat is at a low level. (840 and 842) As a result, the thermostat receives the data transmission and fulfills the request to change the thermostat setting. (844) Alternate implementations may use more than two battery levels and more than two corresponding thermostatic importance classifications for data such as a three classification system with low, medium, and high thermostatic importance classification data types.

Figure 9A:
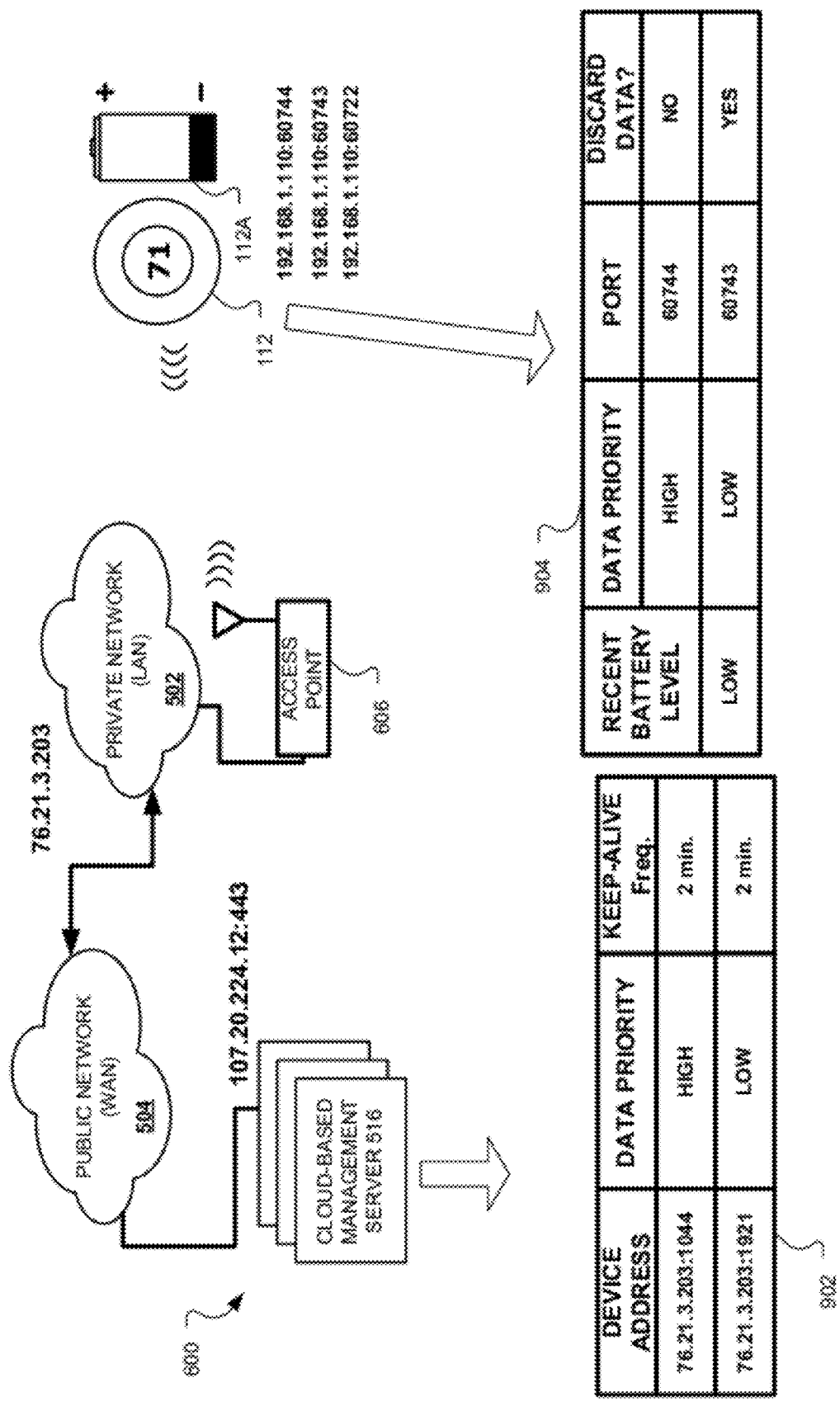
FIG. 9A-9B illustrates a a communication system and schematic of a battery powered thermostat using a plurality of communication channels to receive data classified under different data priority types in accordance with embodiments of the present invention.
Figure 9B:
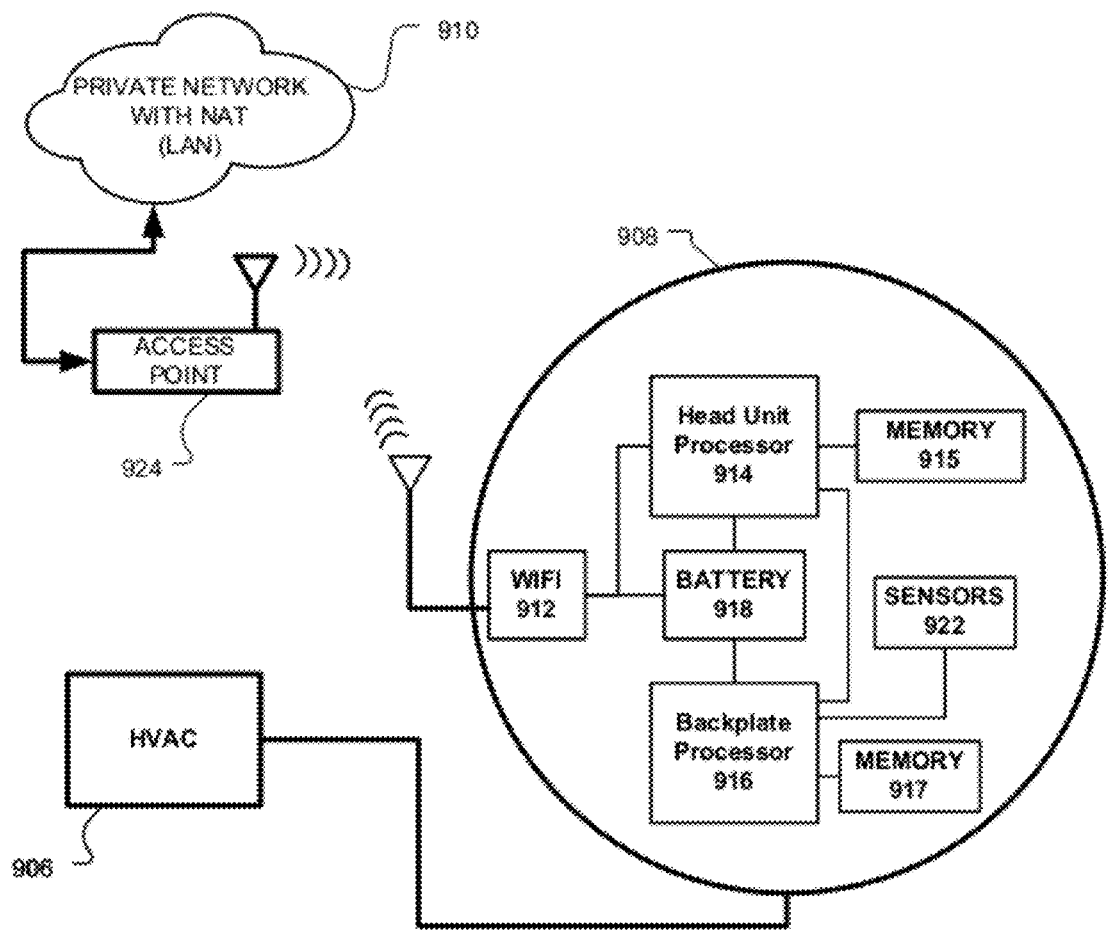

In an alternate embodiment, a battery powered thermostat and system illustrated in FIG. 9A-9B uses a plurality of communication channels to exchange data classified with different priority in accordance with embodiments of the present invention. Accordingly, in this embodiment the thermostat 112 receives data of different priority from cloud-based management server 516 over corresponding different communication channels and, depending on the battery-level, may either process or discard the data received. Advantageously, the processing associated with this embodiment is distributed partly on cloud-based management server 516 and partly on thermostat 112. As one distinct advantage, thermostat 112 can determine the battery-level without polling or indirectly gathering data thus resulting in a more accurate processing of data packets received from thermostat communication server 620.

For example, thermostat 112 in FIG. 9A has established two wireless communication channels using private network address and port combinations 192.168.1.110:60744 and 192.168.1.110:60743. These private network addresses on thermostat 112 have corresponding entries in NAT table 518 in FIG. 5 identified with NAT port entries 1044 and 1921. Cloud-based management server 516 in FIG. 9A stores corresponding public addresses and port numbers 76.21.3.203:1044 and 76.21.3.203:1921 for thermostat 112 in a priority transmission table 902 and also associates a high and low-priority data type to each address as illustrated. In accordance with some embodiments, cloud-based management server 516 classifies data to be sent to the thermostat as being a low or high-priority data type and then sends over the appropriate communication channel or public address as indicated in priority transmission table 902. Data passes over public network 504, private network 502, and wirelessly from access point 606 illustrated in FIG. 9A onto thermostat 112.

Settings within the Wifi module (not shown) of thermostat 112 determine whether to process or discard the data depending on which communication channel the data is received. As a reflection of settings in the Wifi module, a power-priority table 904 identifies that the recent battery-level of thermostat 112 is at a low level, as illustrated by battery image 112A, and that ports 60744 and 60743 are used to process high and low data types respectively. Because the most recent battery-level was low, power-priority table 904 also indicates in this example that the Wifi module has been configured to ignore or discard low-priority data arriving on ports 60743 and process only high-priority data received over port 60744. Over time, thermostat 112 may update the configuration of the Wifi module to accept or discard packets depending on the battery-level the thermostat 112 detects. If thermostat 112 later determines the battery-level is high, thermostat 112 reconfigures WiFi module to subsequently process both low and high-priority data packets arriving over both ports. In alternate embodiments, Wifi module may also be configured to use greater or fewer ports and process either greater or fewer data priority types. For example, three communication channels may be used to process either high-priority, medium-priority or low-priority data types rather than just either high-priority or low-priority data types.

Referring to FIG. 9B, a schematic block diagram provides an overview of some components inside a thermostat in accordance with embodiments of the present invention. Thermostat 908 is similar to thermostat 112 in FIG. 9A except that thermostat 908 also illustrates and highlights selected internal components including a Wifi module 912 and antenna, a head unit processor 914 with associated memory 915, a backplate processor 916 with associated memory, and sensors 922 (e.g., temperature, humidity, motion, ambient light, proximity). In one embodiment, head unit processor 914 can be a Texas Instruments AM3703 Sitara ARM microprocessor while backplate processor 916, which may be more specifically referenced to as a "microcontroller", can be a Texas Instruments MSP430F microcontroller. Further details regarding the physical placement and configuration of the thermostat head unit, backplate, and other physical elements are described in the commonly assigned U.S. Ser. No. 13/199, 108, supra.

For some embodiments, the backplate processor 916 is a very low-power device that, while having some computational capabilities, is substantially less powerful than the head unit processor 914. The backplate processor 916 is coupled to, and responsible for polling on a regular basis, most or all of the sensors 922 including the temperature and humidity sensors, motion sensors, ambient light sensors, and proximity sensors. For sensors 922 that may not be located on the backplate hardware itself but rather are located in the head unit, ribbon cables or other electrical connections between the head unit and backplate are provided for this purpose. Notably, there may be other sensors (not shown) for which the head unit processor 914 is responsible, with one example being a ring rotation sensor that senses the user rotation of the outer ring 302 (see FIGS. 4A-4B, supra). Each of the head unit processor 914 and backplate processor 916 is capable of entering into a "sleep" state, and then "waking up" to perform various tasks.

The backplate processor 916, which in some embodiments will have a low-power sleep state that corresponds simply to a lower clock speed, generally enters into and out of its sleep mode substantially more often than does the more powerful head unit processor 914. The backplate processor 916 is capable of waking up the head unit processor 914 from its sleep state. For one preferred embodiment directed to optimal battery conservation, the head unit processor 914 is allowed to sleep when its operations are not being called for, while the backplate processor 916 performs polling of the sensors 922 on an ongoing basis, maintaining the sensor results in memory 917. The backplate processor 916 will wake up the head unit processor 914 in the event that (i) the sensor data indicates that an HVAC operation may be called for, such as if the current temperature goes below a currently active heating setpoint, or (ii) the memory 917 gets full and the sensor data needs to be transferred up to the head unit processor 914 for storage in the memory 915. The sensor data can then be pushed up to the cloud server (thermostat management server) during a subsequent active communication session between the cloud server and the head unit processor 914.

In the case of Wifi module 912, one embodiment may be implemented using Murata Wireless Solutions LBWA19XSLZ module, which is based on the Texas Instruments WL1270 chipset supporting the 802.11b/g/n WLAN standard. Embodiments of the present invention configure and program Wifi module 912 to allow thermostat 908 to enter into a low power or "sleep" mode to conserve energy until one or several events occurs. For example, in some embodiments the Wifi module 912 may leave this low power mode when a user physically operates thermostat 908, as illustrated in FIGS. 4A and 4B, which in turn may also cause activation of both head-unit processor 914 and backplate processor 916 for controlling functions in head-unit 312 and backplate 314 portions of thermostat 110 depicted in FIG. 3B.

It is also possible for Wifi module 912 to wake from a low power mode at regular intervals in response to a beacon from wireless access point 912. To conserve energy, Wifi module 912 may briefly leave the low power mode to acknowledge the beacon as dictated by the appropriate wireless standard and then return to a low power mode without activating the processors or other components of thermostat 908 in FIG. 9B. In an alternative embodiment, Wifi module 912 may also respond to the beacon by awaking briefly and then activating backplate processor 916, head unit processor 914, or other portions of thermostat 908 to gather data through sensors 922 and store the results in a data log 926 with a time stamp, event type and corresponding data listed for future reference. In accordance with one embodiment, backplate processor 916 may collect data in data log 926 and store in memory 920 for a period of time or until the log reaches a maximum predetermined size. At that point, the backplate processor 916 may wake head unit processor 914 to coordinate an upload of the data log 926 stored in memory 920 over a public network, such as the Internet, to cloud-based management server 516. Uploading data log 926 less frequently saves time and energy associated with more frequent transmission of individual records or log entries.

In yet another embodiment, WiFi module 912 may selectively filter an incoming data packet to determine if the header is merely an acknowledgement packet (i.e., a keep-alive packet) or contains a payload that needs further processing. If the packet contains only a header and no payload, the WiFi module 912 may be configured to either ignore the packet or send a return acknowledgement to the thermostat management system or other source of the packet received.

In further embodiments, WiFi module 912 may be used to establish multiple communication channels between thermostat 112 and cloud-based management server 516 as described and illustrated in FIG. 9A. As previously described, thermostat 112 uses the multiple communication channels to receive different types of data classified with different levels of priority. In one embodiment, Wifi module 912 may be programmed to use one or more filters and a wake-on-LAN feature to then selectively ignore or discard data arriving over one or more of these communication channels. For example, low-priority data arriving over a port on Wifi module 912 may be discarded by disabling the corresponding wake-on-LAN feature associated with the port. This allows the communication channel to continue to operate yet conserves battery power by discarding or ignoring the low-priority packets.

Figure 9C:
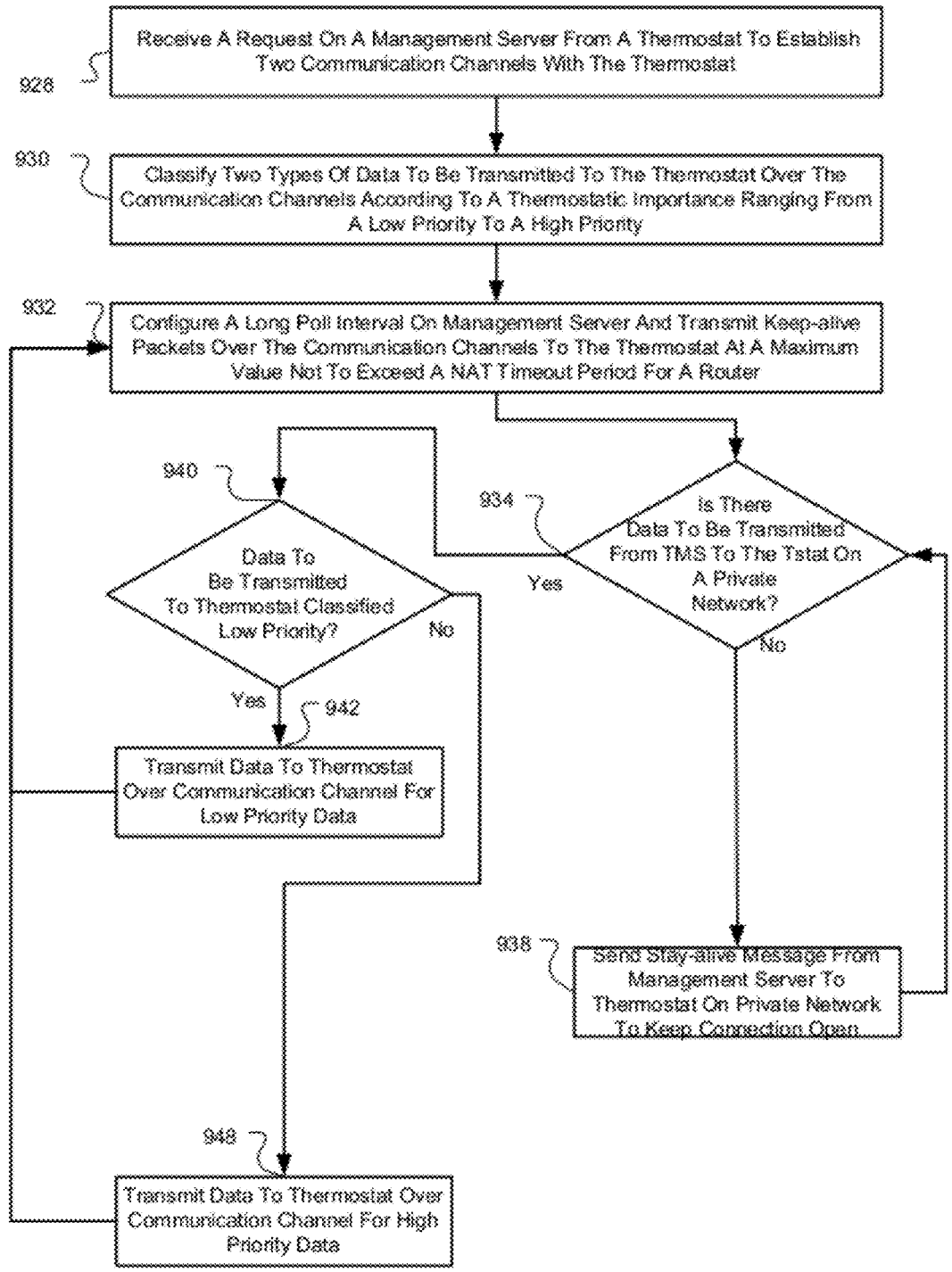
FIG. 9C-9D illustrate flowchart diagrams of operations a thermostat communication server and thermostat use to communicate over a plurality of communication channels accordance with embodiments of the present invention.
Figure 9D:
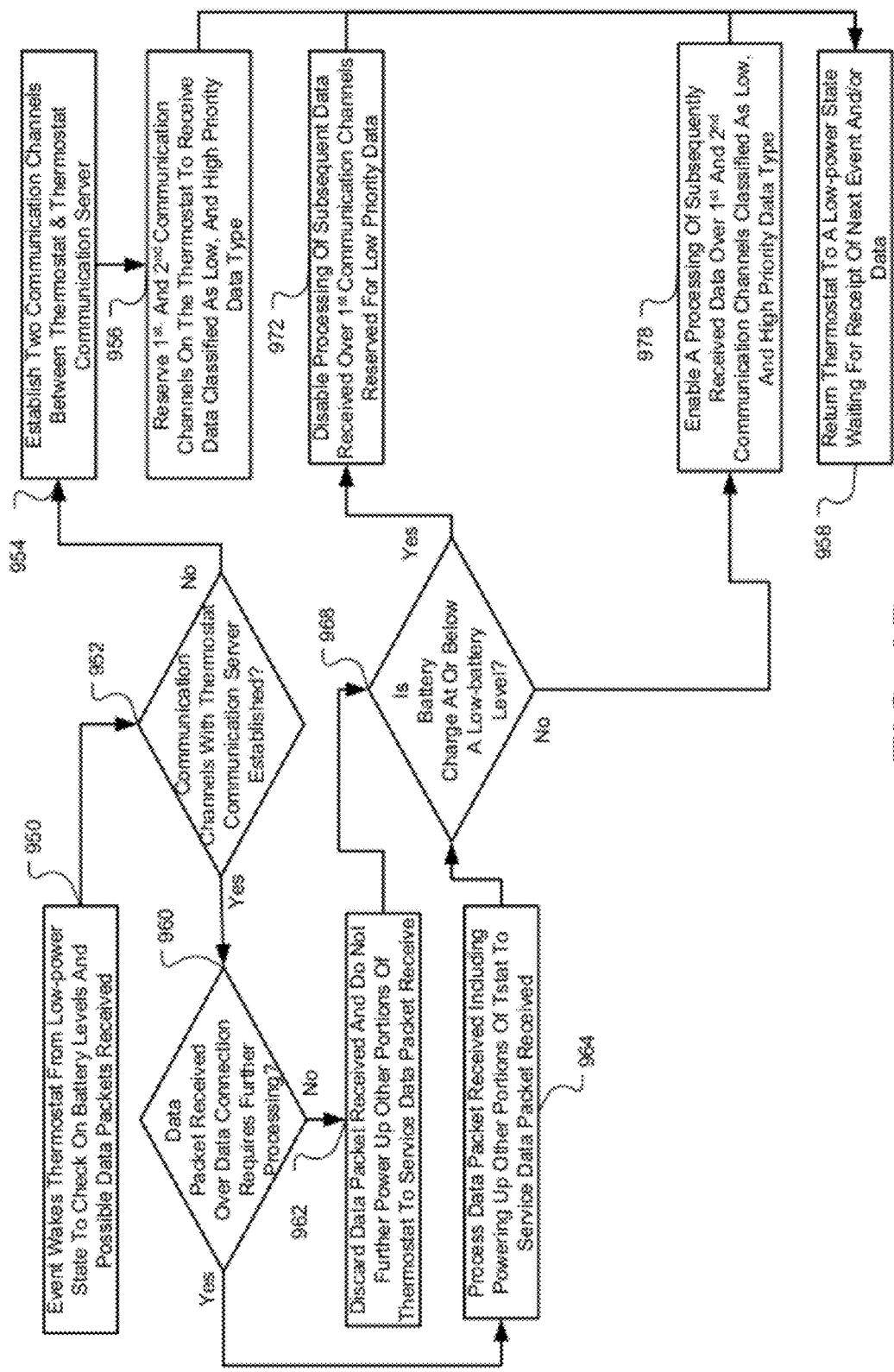

Flowchart diagram in FIGS. 9C-9D concern the operations on cloud-based management server 516 and thermostat 112 in accordance with embodiments of the present invention as illustrated in FIGS. 9A and 9B. In one embodiment, flowchart diagram in FIG. 9C provides the operations used by a thermostat communication server to communicate over a plurality of communication channels with a battery powered thermostat. In this embodiment, thermostat communication server, such as cloud-based management server 516 in FIG. 9A, receives a request from a thermostat powered by a battery to establish a plurality of communication channel between the thermostat and the thermostat communication server over a network. (928) When the thermostat initiates the communication channel, a router places a plurality of entries in a NAT table, such as NAT table 518 in FIG. 5, providing multiple communication channels for the thermostat to communicate with the thermostat communication server on the Internet, a public network. As previously described, these entries in the NAT table will not be removed and the communication channel will remain open as long as any gap in communication from the thermostat communication server and the thermostat does not exceed a NAT time-out value associated with the router.

Next, thermostat communication server classifies one or more types of data to be transmitted to the thermostat over the communication channel according to a data priority ranging from a low-priority data type to a high-priority data type. (930) In one implementation, the low-priority data type includes data of lesser importance to the operation of the overall thermostat management system and thermostat. These may include optional functions to be performed on the thermostat such as software update or other maintenance. Conversely, the high-priority data type includes data of higher importance to the operation of the thermostat management system and the thermostat and generally includes requests to actively perform an action on the thermostat such as changing a setpoint, turning-on/off heating or cooling or checking ambient temperature in a residence or commercial location where the thermostat is located.

To keep the communication channel open, thermostat communication server may configure a long-poll interval for transmitting keep-alive packets over the plurality of communication channels to the thermostat. (932) In some embodiments, the thermostat communication server sets the long-poll interval to a maximum value not to exceed a NAT timeout period used by most routers, which is often approximately 100 minutes.

If no data passes between thermostat communication server and the thermostat (934-No), a timer, initially set to the long-poll interval, decreases over time within the communication protocol stack and the process continues. Eventually, if the long-poll interval runs out of time and the communication protocol stack on the thermostat communication server, such as TCP/IP, did not detect communication activity, the built-in keep-alive feature sends packets to keep the NAT entries on the router and the communication channels open. (938) In some embodiments, the thermostat communication server may request the thermostat to terminate and reestablish the communication channel when the timer associated with the long-poll interval expires to help make sure the communication channel is available and operating properly.

Alternatively if there is data to be sent, the thermostat communication server checks the priority of the data and sends over the proper communication channel. Accordingly in one embodiment, if the data is classified as low-priority (940-Yes), thermostat communication server sends the data over a communication channel reserved for low-priority data transmissions. (942) Alternatively, if the data is classified as high-priority and not low-priority (940-No), thermostat communication server sends the data over a communication channel reserved for high-priority data transmissions. (948) In this embodiment, thermostat communication server segregates the data on different communication channels but allows the thermostat to determine whether to process or discard the data as it easy easier for the thermostat to obtain battery-level data and make a decisions.

FIG. 9D is a flowchart diagram of the complimentary operations performed on a thermostat to conserve battery energy yet process data at a high level of performance. In this embodiment, a thermostat, such as thermostat 112 in FIG. 9A, may wake from a low power state to check on battery-levels or possible data packets received over one or several communication channels. (950) For example, a thermostat may wake from a low power state once every 100 ms to respond to a wireless strobe from an access point 924 and may also check on a battery-level. It is also possible that a wake-on-LAN event wakes the thermostat causing it to leave the low power state and process a data packet received over one or several communication channels reserved for different priority levels of data.

In some embodiments, the thermostat may determine that the communication channels with thermostat communication server, such as with thermostat communication server 620, have not been established. (952-No) Accordingly, one embodiment of the present invention may request and establish two communication channels between the thermostat communication server and the thermostat. (954) In accordance with some embodiments, the thermostat reserves the first and second communication channels on the thermostat to receive data classified as low and high-priority data types. The thermostat initially configures its Wifi module, such as Wifi module 912 in FIG. 9B, to receive low and high-priority data packets from each of the several communication channels using a built-in wake-on-LAN feature. (956) To reduce power consumption, thermostat may then return to a low power state waiting for the next event or receipt of data. (958)

Alternatively, if the communication channels are established, (952-Yes), the thermostat determines if a data packet has been received and requires further processing. (960) In some embodiments, the Wifi module on the thermostat may inspect the data packet header or payload and determine that the data packet needs no further processing and can be discarded. (960-No) For example, the data packet may be discarded if it is a keep-alive packet meant to preserve the NAT table entries in the router or if the packet otherwise has no payload data associated with it. If the packet is discarded, the thermostat may conserve overall power consumed because other components in the thermostat, such as head unit processor 914 or backplate processor 916, can remain in a low power state. (962)

If the packet does require further processing, (960-Yes) then the thermostat may activate or power-up other portions of the thermostat to service the data packet received. (964) In some embodiments, thermostat may activate head unit processor 914 to perform a change of a setpoint or other feature on the thermostat or may activate back plate processor 916 to gather sensor information as requested from thermostat communication server 620.

Once a packet has been processed or discarded, embodiments of the present invention check the current battery-level of the thermostat and adjust the communication channels to either accept or discard subsequent data packets. If the thermostat determines the battery charge is at or below a low battery-level, (968-Yes) the Wifi module is configured to discard subsequent data received over a first communication channel reserved to received low priority data. (972) As previously described, some embodiments discard packets over a communication channel and port of the Wifi module by turning off a wake-on-LAN feature for the channel. This causes subsequent low priority packets received on the channel to be ignored and discarded. In some implementations, the Wifi module is configured to process packets on the second communication channel using a filter to locate the proper port number and enabling the wake-on-LAN feature for the selected filter. Lastly, if the battery charge is above the low battery-level (968-No) then embodiments of the present invention enable processing of subsequently received packets over the first and second communication channels. (978) For example, if the battery-level charge is high then embodiments of the present invention are adjusted to process more data and further improve the thermostat's performance and ability to respond to instructions and requests. After checking the battery-level and adjusting the Wifi module, the thermostat returns to a low power state to conserve energy consumption and await the next event and/or data to be processed. (958)

Figure 9E:
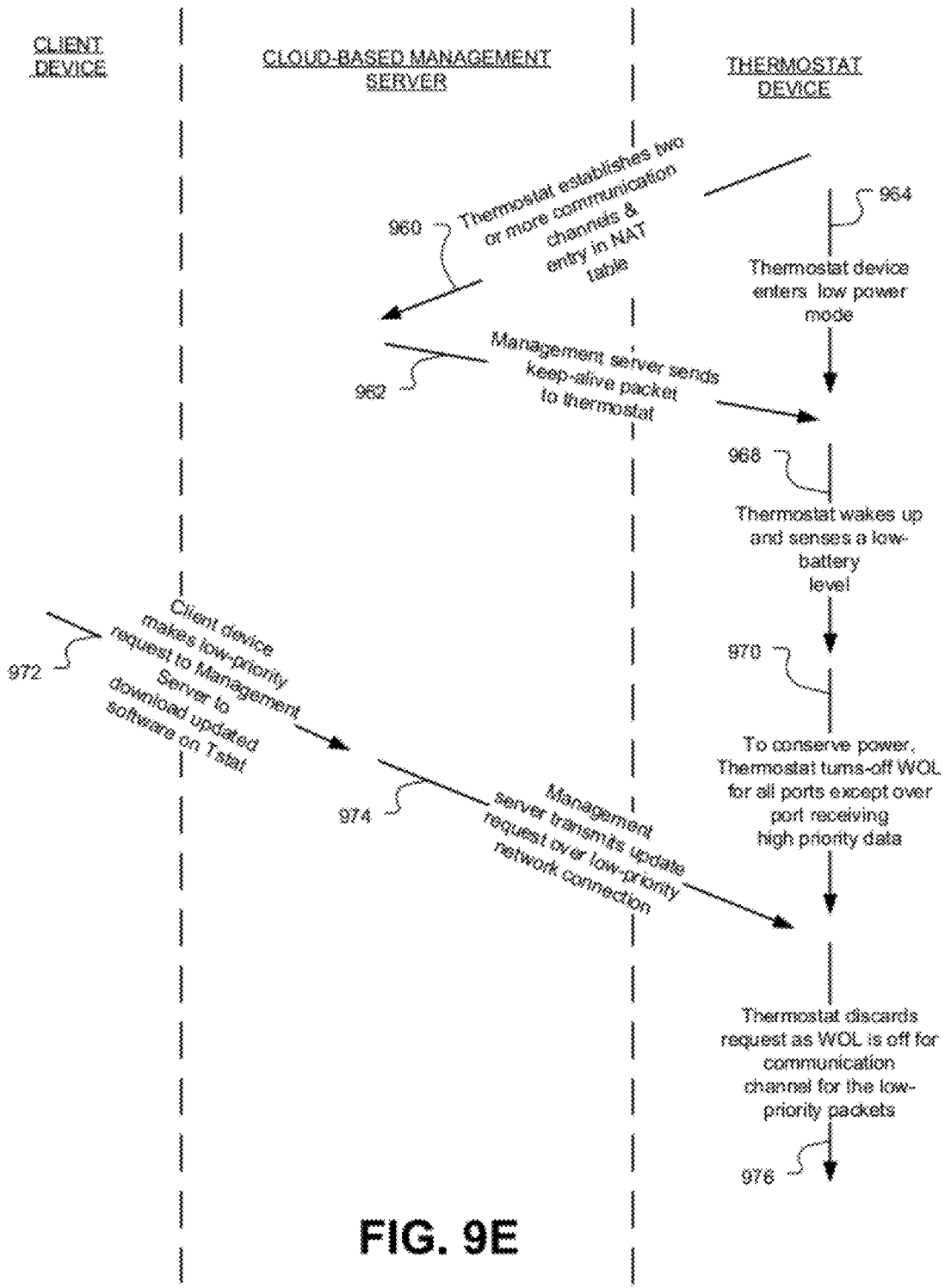
FIG. 9E provides an example data flow chart illustrating the flow of data and events using a plurality of communication channels transmitting different data priority types in accordance with embodiments of the present invention.

An example data flow chart in FIG. 9E illustrates the flow of data and events using a plurality of communication channels to transmit different priority levels of data. In this example, the thermostat initiates establishment of a a plurality of communication channels with thermostat communication server causing a router to creates corresponding entries in a NAT table. (960) In some embodiments, a first communication channel is reserved for low-priority types of data and a second communication channel is reserved for high-priority types of data. To conserve energy, the thermostat enters a low power mode and waits for the next event. (964). After a period of time, a long-poll interval expires causing the thermostat communications server to send a keep-alive packet before the NAT table entry is removed. (962) In one embodiment, the thermostat wakes from the low power mode and sensing a low battery-level and making note of the local condition. In this embodiment, the thermostat does not forward to the thermostat communication server since it is up to the thermostat to determine whether to process the received data packets. Instead, thermostat turns off a wake-on-LAN (WOL) feature for all ports except the port receiving high-priority types of data. (970) For example, subsequently received packets received on the first communication channel may be discarded since the low-priority data is reserved for the first communication channel. At some later point in time, a client device, such as tablet 506 running thermostat access client 514 in FIG. 5, requests that thermostat communication server downloads a software update to the thermostat. (972) Thermostat communication server classifies request as a low-priority data type and transmits over the first communication channel regardless of the battery-level on the thermostat. (974) In some embodiments, thermostat communication server segregates different priority data types on different communication channels and lets the thermostat decide whether to discard or process the packets received. Eventually, the thermostat receives the software update request but discards the packets as the battery-level is low and the first communication channel is configured to ignore the low-priority data packets that it may receive. (976).

Figure 10A:
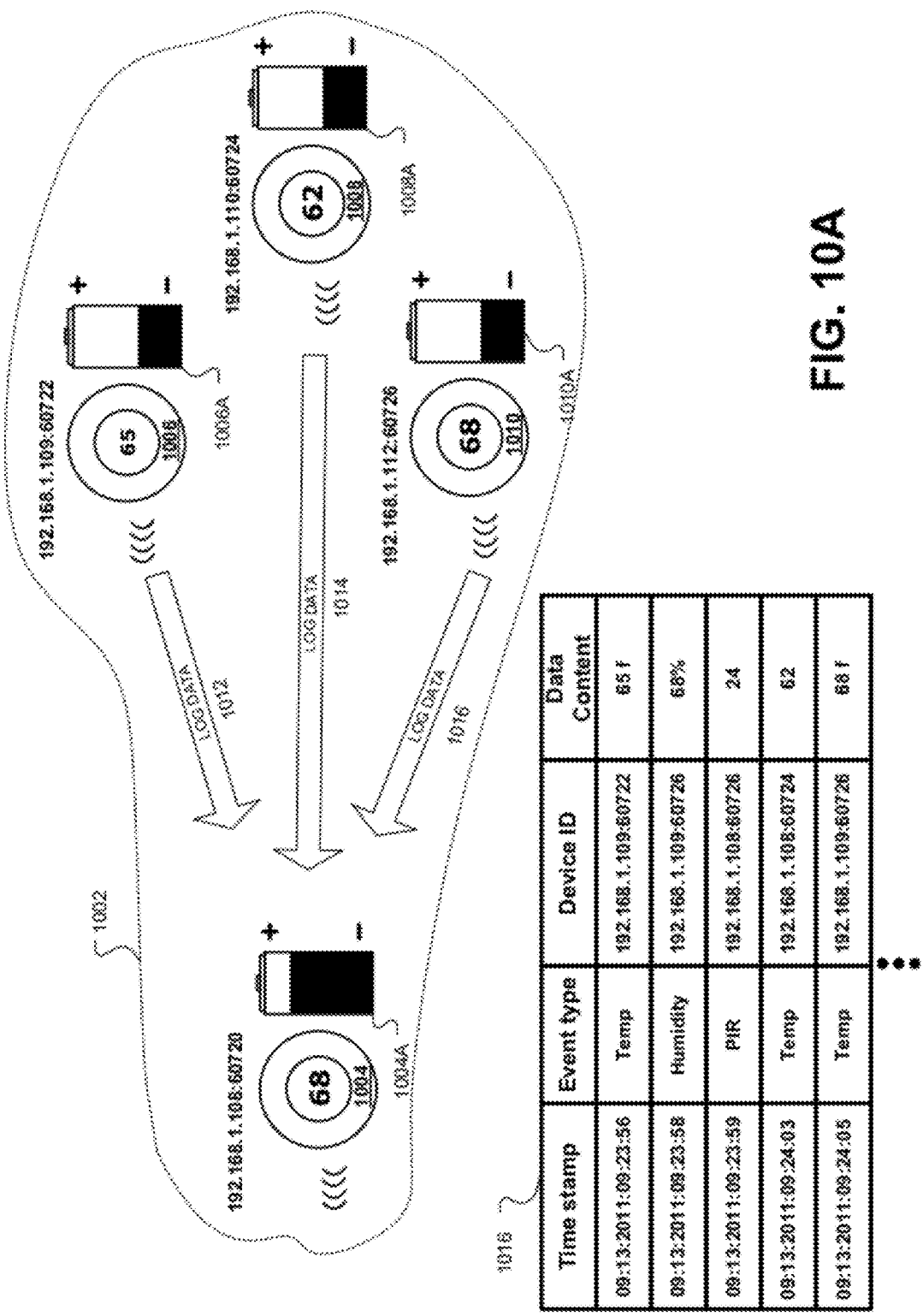
FIGS. 10A-10B provide a schematic block diagram and flowchart for a thermostat reporting group with multiple thermostats that gathers events in a common event log in accordance with embodiments of the present invention.
Figure 10B:
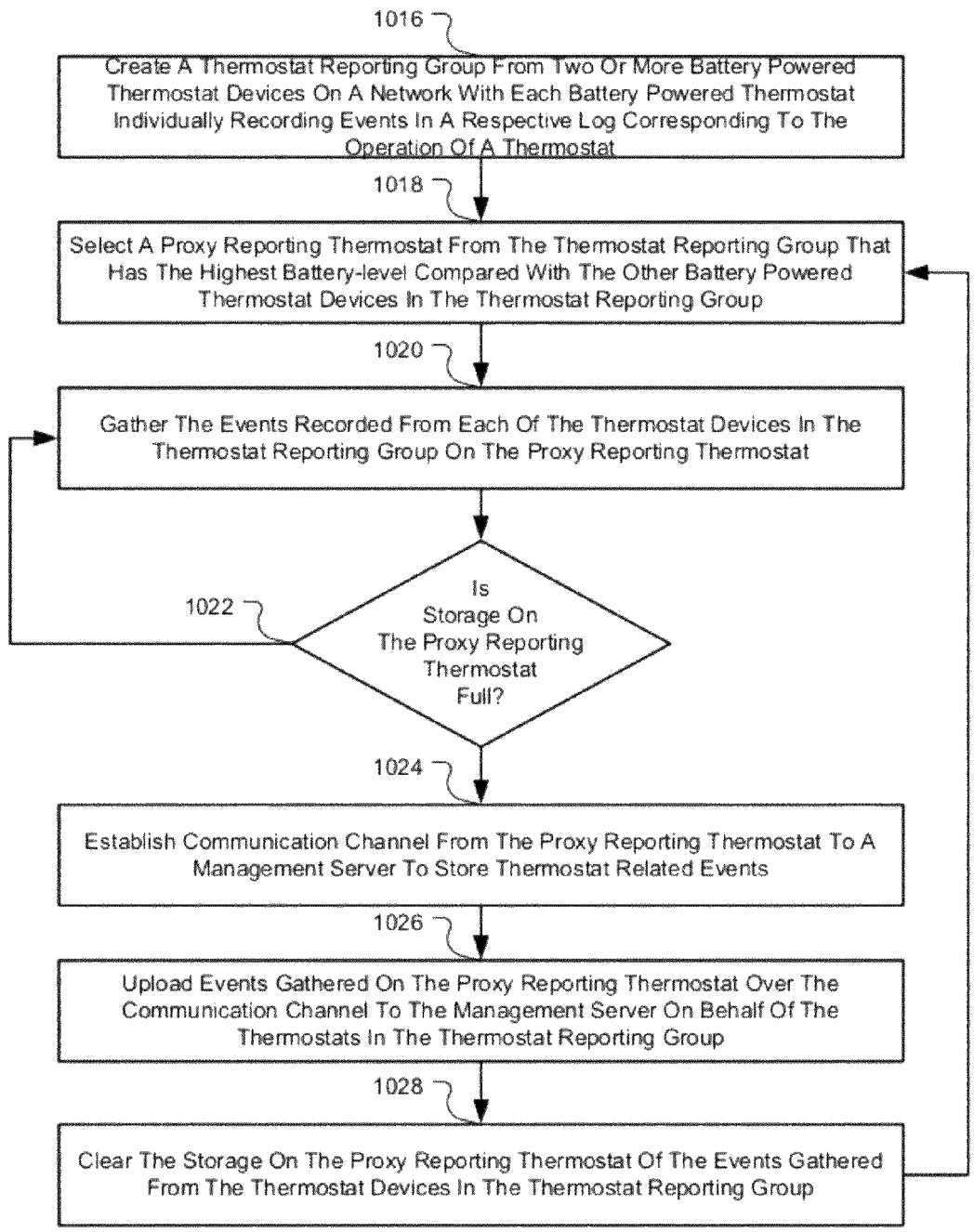

FIGS. 10A-10B provide a schematic block diagram and flowchart for creating a thermostat reporting group with multiple thermostats and gathering reporting events in a common event log. In FIG. 10A, a thermostat reporting group 1002 is formed from several thermostats in a network including thermostat 1004, thermostat 1006, thermostat 1008 and thermostat 1010 whereupon each thermostat has a current battery-level as represented by battery images 1004A, battery image 1006A, battery image 1008A and battery image 1010A respectively. To conserve energy, a proxy reporting thermostat is selected from the thermostat reporting group to receive the event log information from other members of the group and then upload over a network to a central server. In this example, thermostat 1004 is selected as the proxy reporting thermostat since the corresponding battery-level indicated by battery image 1004A is the highest within the thermostat reporting group.

Once selected, thermostat 1004 gathers log data over the network from other thermostats 1006, 1008 and 1010 through local transfers 1012, 1014, and 1016 respectively. These local transfers include the log data from each thermostat combined into a common log 1016 identifying a time stamp, event type, device ID and data content for each entry. After a period of time or when memory (not shown) in thermostat 1004 fills up, the common log 1016 is uploaded over a communication channel to a central server such as the cloud-based management server 516. This approach allows event log information to be gathered using fewer uploads than would be required if each thermostat was required to upload individually. It also allows thermostats having a low battery-level to preserve their battery charge while still allowing such data to be collected and analyzed on a server such as cloud-based management server 516 in FIG. 5.

FIG. 10B is a flowchart diagram of the operations associated with gathering reporting events on a proxy reporting thermostat and common event log in accordance with embodiments of the present invention. In one embodiment, a thermostat reporting group is created from a plurality of battery powered thermostats on a network. (1016). Each battery powered thermostat individually records events in a respective event log corresponding to the one or more operations and events occurring on a thermostat. In some cases, the events may include sensor information provided from humidity sensors, temperature sensors, passive infra-red sensors, ambient light sensors, active proximity sensors or other sensors incorporated into each thermostat. Event logs may also include information describing current or changed settings on a thermostat and the time stamp associated with when these settings were changed.

As previously described, embodiments of the present invention select a proxy reporting thermostat to represent the other thermostats. (1018). In some embodiments, the proxy reporting thermostat is selected based on having the highest battery-level compared with the other battery powered thermostats in the thermostat reporting group. For example, thermostat 1004 in FIG. 10A has the highest charged battery in the group and is thus selected as the proxy reporting thermostat.

Over time, the proxy reporting thermostat gathers events recorded from each of the thermostats in the thermostat reporting group. (1020) Proxy reporting thermostat may collect these events from each thermostat in the thermostat reporting group using a wireless ad-hoc connection or a wireless connection made available through a network access point or router. The proxy reporting thermostat generally continues to collect the data from the other thermostats until storage on the proxy reporting thermostat is full or has reached a maximum allocation for such logs. (1022) For example, a thermostat may have allocated 500 megabytes for storing the log information from multiple thermostats before triggering the upload process.

If the storage on the proxy reporting thermostat is full, one embodiment of the proxy reporting thermostat establishes a communication channel to a thermostat management system to store the thermostat events. (1024) For example, this may be connection over the Internet between the thermostat on a private network and the thermostat management system. Next, one embodiment uploads events gathered on the proxy reporting thermostat over the communication channel to the thermostat management system on behalf of the thermostats in the thermostat reporting group. (1026) Once the data in the common event log has been successfully uploaded, embodiments of the present invention clear the storage area on the proxy reporting thermostat of the events gathered from the thermostat reporting group. (1028). This makes way for storage of more events in the event log on the proxy reporting thermostat.

While examples and embodiments have been described, they should not serve to limit any aspect of the present invention. Accordingly, various modifications may be made without departing from the spirit and scope of the invention. Indeed, various methods and system for communicating and operating thermostats, HVACSs and other devices have been provided yet the methods and systems are meant to be illustrative and not limiting as to the scope of the overall invention. It is to be appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A thermostat, comprising:
   a battery configured to provide operational power for the thermostat;
   a processor coupled to the battery and configured to operate in a sleep mode and a wake mode; and
   a Wi-Fi chip coupled to the processor and configured to wirelessly communicate with a thermostat management server via an access point, wherein:
      the processor is further configured to, while operating in the wake mode, send to the thermostat management server via the Wi-Fi chip a request to establish a communication channel between the thermostat and the thermostat management server;
      the processor is further configured to, after sending the request to establish a communication channel between the thermostat and the thermostat management server, change its mode of operation from the wake mode to the sleep mode; and
      the Wi-Fi chip is further configured to:
         receive data packets from the thermostat management server while the processor operates in the sleep mode;
         determine a priority level of the received data packets, wherein the priority level comprises a standard priority level and a keep-alive priority level;
         filter the received data packets based on the determined priority level of each packet such that the keep-alive priority level packets are discarded; and
         forward the standard priority level packets to the processor.

2. The thermostat of claim 1, wherein the Wi-Fi chip is further configured to communicate with the access point through a plurality of ports, and the priority level of the received data packets is determined based on which of the plurality of ports the data packets are received on.

3. The thermostat of claim 1, wherein the processor is further configured to:
   receive charge-level information associated with the battery; and
   send at least some of the charge-level information to the thermostat management server via the Wi-Fi chip.

4. The thermostat of claim 1, wherein the keep-alive priority level packets are received according to keep-alive intervals, wherein the period for the keep-alive intervals is based on a minimum time that the access point is expected to maintain an entry for the thermostat in an address translation table.

5. The thermostat of claim 1, wherein the keep-alive priority level packets are received at keep-alive intervals, wherein the period for the keep-alive intervals is based on a charge level associated with a battery of the thermostat.

6. The thermostat of claim 1, wherein the keep-alive priority level packets are received according to keep-alive intervals, wherein the period for the keep-alive intervals is between approximately 1 minute to approximately 5 minutes.

7. The thermostat of claim 1, wherein the keep-alive priority level packets comprise TCP/IP ACK packets.

8. The thermostat of claim 1, wherein the Wi-Fi chip is further configured to:
   receive a keep-alive packet from the thermostat management server while the processor is in the sleep mode;
   send a return acknowledgement of the keep-alive packet to the thermostat management server while the processor is in the sleep mode.

9. A method of communicating data between a thermostat and a thermostat management server, comprising:
   operating a processor of a thermostat in a wake mode, the wake mode being selected from a plurality of modes of operation of the thermostat including the wake mode and a sleep mode;
   sending, from the thermostat to the thermostat management server, while the processor is operating in the wake mode, and via a Wi-Fi chip included in the thermostat and coupled to the processor, a request to establish a communication channel between the thermostat and the thermostat management server through an access point;
   changing, at the thermostat and after sending the request to establish a communication channel between the thermostat and the thermostat management server, the mode of operation of the thermostat from the wake mode to the sleep mode;
   receiving, by the Wi-Fi chip, data packets from the thermostat management server while the processor operates in the sleep mode;
   determining, by the Wi-Fi chip, a priority level of the received data packets, wherein the priority level comprises a standard priority level and a keep-alive priority level;
   filtering, by the Wi-Fi chip, the received data packets based on the determined priority level of each packet such that the keep-alive priority level packets are discarded; and
   forwarding, by the Wi-Fi chip, the standard priority level packets to the processor.

10. The method of claim 9, further comprising:
    receiving a keep-alive packet at the Wi-Fi chip from the thermostat management server while the processor is in the sleep mode;

sending, from the Wi-Fi chip to the thermostat management server, a return acknowledgement of the keep-alive packet while the processor is in the sleep mode.

11. The method of claim 9, further comprising:
receiving, at the Wi-Fi chip and from the thermostat management server, a request to terminate and reestablish the communication channel; and
sending, from the thermostat to the thermostat management server, a request to reestablish the communication channel between the thermostat and the thermostat management server through the access point.

12. The method of claim 9, wherein the access point stores an address translation table that translates between a network address of the thermostat on a first network to a network address of the access point on a second network, the first network being a private network that is local to the thermostat, the second network being a public network that includes the thermostat management server.

13. The method of claim 12, further comprising:
receiving, at the Wi-Fi chip, from the thermostat management server, and via the access point, a transmission, wherein the transmission prevents the access point from removing an entry for the thermostat from the address translation table.

14. The method of claim 9, further comprising:
receiving, by the Wi-Fi chip, data that is classified as high-priority data and low-priority data; and
filtering, by the Wi-Fi chip, the received data, wherein the filtering is based on whether the data is classified as high priority or low priority.

15. The method of claim 14, further comprising:
receiving, by the Wi-Fi chip, the high-priority data regardless of the battery level of the thermostat and receiving the low-priority data when the battery level of the thermostat is not low.

16. The method of claim 9,
wherein the keep-alive priority packets are received during a long-polling interval.

17. The method of claim 16 wherein the long-polling interval is approximately 100 minutes.

18. The method of claim 9, further comprising:
receiving charge-level information associated with the battery; and
sending at least some of the charge-level information to the thermostat management server via the Wi-Fi chip.

* * * * *